United States Patent
Zhao

(10) Patent No.: US 11,006,476 B2
(45) Date of Patent: May 11, 2021

(54) METHOD AND APPARATUS FOR NETWORK CONNECTION

(71) Applicant: Samsung Electronics Co., Ltd., Suwon-si (KR)

(72) Inventor: Fujun Zhao, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/429,718

(22) Filed: Jun. 3, 2019

(65) Prior Publication Data
US 2020/0154505 A1 May 14, 2020

(30) Foreign Application Priority Data
Nov. 9, 2018 (CN) .......................... 201811333320.3

(51) Int. Cl.
H04W 76/27 (2018.01)
H04W 76/11 (2018.01)
H04W 76/12 (2018.01)
H04W 76/32 (2018.01)

(52) U.S. Cl.
CPC ............ H04W 76/27 (2018.02); H04W 76/11 (2018.02); H04W 76/12 (2018.02); H04W 76/32 (2018.02)

(58) Field of Classification Search
CPC combination set(s) only.
See application file for complete search history.

(56) References Cited

U.S. PATENT DOCUMENTS

| 8,565,822 | B2 | 10/2013 | Kim |
| 9,949,125 | B2 | 4/2018 | Hahn et al. |
| 2008/0167042 | A1* | 7/2008 | Kitazoe ................. H04W 36/10 455/436 |
| 2011/0176511 | A1* | 7/2011 | Sayeedi ............ H04W 36/0016 370/331 |
| 2013/0310001 | A1* | 11/2013 | Midkiff ................. H04W 8/205 455/411 |
| 2015/0092747 | A1 | 4/2015 | Ganesan |
| 2015/0189468 | A1* | 7/2015 | Yuk ........................ H04W 36/14 455/436 |
| 2016/0241600 | A1* | 8/2016 | Khan ................... H04W 12/007 |
| 2017/0094589 | A1 | 3/2017 | Bhasin et al. |
| 2017/0105193 | A1 | 4/2017 | Liu et al. |
| 2017/0359800 | A1 | 12/2017 | Cui et al. |
| 2017/0374597 | A1 | 12/2017 | Ray et al. |
| 2018/0020464 | A1 | 1/2018 | Liang et al. |
| 2018/0035403 | A1 | 2/2018 | Yu |
| 2018/0124859 | A1* | 5/2018 | Cho .................. H04W 36/0009 |
| 2018/0184309 | A1 | 6/2018 | Bhardwaj et al. |
| 2018/0199395 | A1* | 7/2018 | Huang-Fu ........... H04L 65/1066 |
| 2018/0213392 | A1 | 7/2018 | Ni et al. |
| 2019/0098487 | A1* | 3/2019 | Boettger ............... H04W 76/12 |
| 2020/0128449 | A1* | 4/2020 | Faus Gregori ........ H04W 84/12 |

OTHER PUBLICATIONS

International Search Report dated Aug. 29, 2019, issued in the International Application No. PCT/KR2019/006656.

* cited by examiner

Primary Examiner — Xavier S Wong
(74) Attorney, Agent, or Firm — Jefferson IP Law, LLP

(57) ABSTRACT

A method and an apparatus for network connection are provided. The method includes connecting to a detected Wi-Fi network for a target identity module of the terminal, and establishing an IP multimedia subsystem (IMS) network connection for the target identity module of the terminal based on the connected Wi-Fi network.

14 Claims, 12 Drawing Sheets

METHOD AND APPARATUS FOR NETWORK CONNECTION

CROSS-REFERENCE TO RELATED APPLICATION(S)

This application is based on and claims priority under 35. U.S.C. § 119(a) of a Chinese patent application number 201811333320.3 filed on Nov. 9, 2018, in the Chinese Intellectual Property Office, the disclosure of which is incorporated by reference herein in its entirety.

BACKGROUND

1. Field

The disclosure relates to mobile communication technologies. More particularly, the disclosure relates to a method and an apparatus for network connection.

2. Description of Related Art

Mobile communication technologies have greatly affected people's lives and brought many convenient and beautiful experiences to people. With continuous enrichment of communication service, one-person with multi-card (such as a subscriber identity module (SIM) card) has become a trend, which has the need for a mobile phone to carry multiple cards, and a terminal of multi-card and multi-standby comes into being and quickly occupies a place in the mobile terminal market.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for network connection in a mobile communication system.

Additional aspects will be set forth in part in the description which follows and, in part, will be apparent from the description, or may be learned by practice of the presented embodiments.

In accordance with an aspect of the disclosure, a method for network connection is provided. The method includes connecting a detected available wireless fidelity (Wi-Fi) network for a target identity module, and, establishing an internet protocol (IP) multimedia subsystem (IMS) network connection for the target identity module, based on the connected Wi-Fi network.

In accordance with another aspect of the disclosure, a method for network connection is provided. The method includes detecting whether the other identity module is in a radio resource control (RRC) connection state, before any one of identity modules establishes a call, and, migrating the RRC state of the identity module in the RRC connection state to an idle state, or synchronizing with a network side for an evolved packet system (EPS) context state of the identity module in the RRC connection state.

In accordance with another aspect of the disclosure, a device for network connection is provided. The device includes a connection module, configured to connect to a detected available Wi-Fi network for a target identity module, and an establishment module, configured to establish an IMS network connection for the target identity module based on the connected Wi-Fi network.

In accordance with another aspect of the disclosure, a device for network connection is provided. The device includes a detection module, configured to detect whether the other identity module is in a RRC connection state, before any one of identity modules establishes a call, and a network interaction module, configured to migrate the RRC state of the identity module in the RRC connection state to an idle state, or synchronize with a network side for an EPS context state of the identity module in the RRC connection state.

In accordance with another aspect of the disclosure, an electronic apparatus is provided. The electronic apparatus includes a processor and a memory, the memory storing at least one instruction, at least one program, a code set, or a set of instructions, the at least one instruction, the at least one program, the code set, or the instruction set being loaded and executed by the processor to implement the method shown in the first aspect or the second aspect of the application.

In accordance with another aspect of the disclosure, a computer readable storage medium is provided. The computer readable storage medium is for storing a computer instruction, a program, a code set, or a set of instructions that, when executed on a computer, cause the computer to implement the method shown in the first aspect or the second aspect of the application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
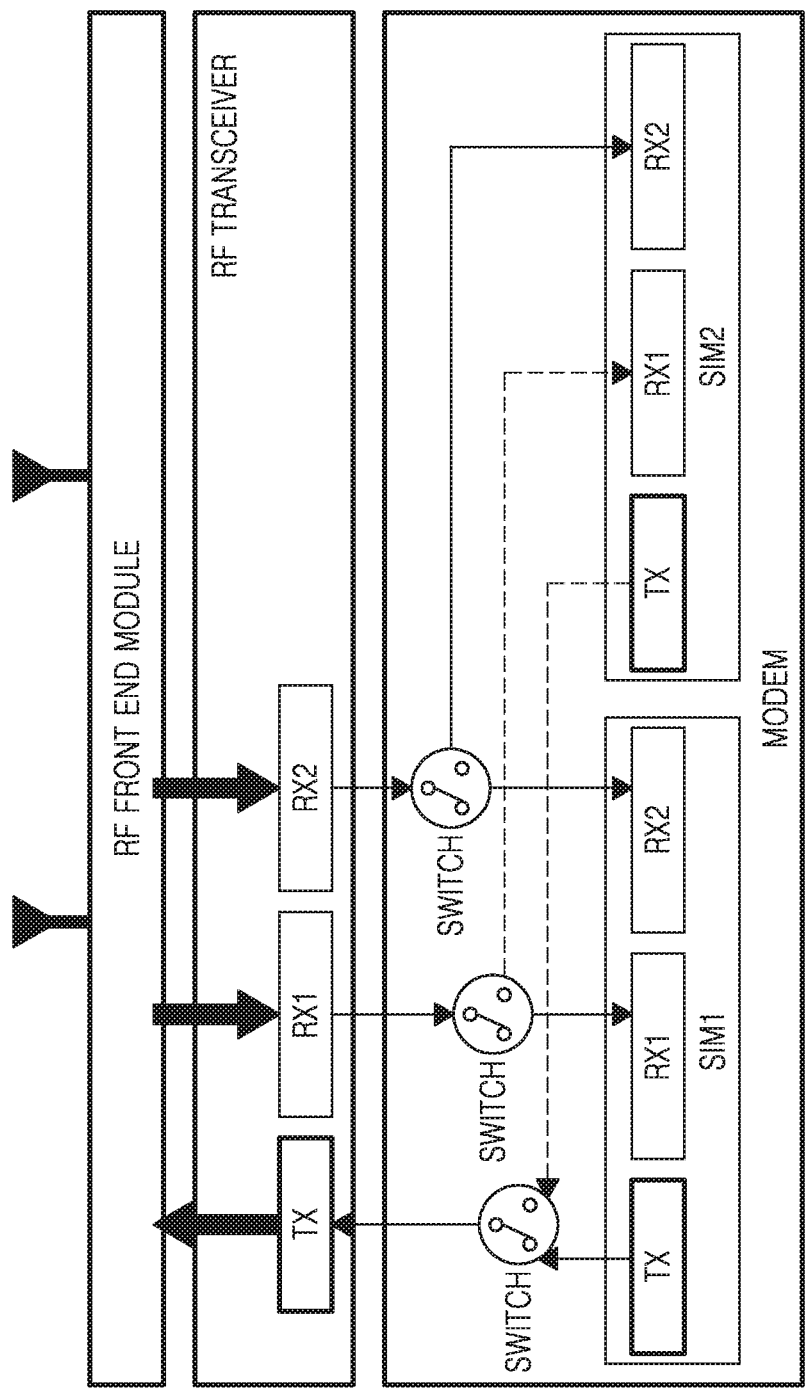
FIG. 1 is a schematic structural diagram illustrating a radio frequency hardware of a terminal of dual-card and single-active according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments of the disclosure, technical content that is well-known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. In addition, the size of each component does not completely reflect the actual size. In the drawings, like reference numerals denote like elements.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that this disclosure will be thorough and complete and will fully convey the concept of the embodiments of the disclosure to one of ordinary skill in the art, and the disclosure will only be defined by the appended claims.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component, such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components, such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. In addition, in the embodiments of the disclosure, the "unit" may include at least one processor.

Wherein, for the purpose of cost and power saving, during hardware design, normally only one radio frequency transmission unit (RF Tx) is usually provided in the most common terminal of multi-card, multi-standby, and single active, taking the terminal of dual-card, dual-standby and single active shown in FIG. 1 as an example.

FIG. 1 is a schematic structural diagram illustrating a radio frequency hardware of a terminal of dual-card and single-active according to an embodiment of the disclosure.

Referring to FIG. 1, in the idle state (which the terminal is not in call), a switch may be used to control the transmission unit (Tx) to continuously switch between the two cards. At this time, the two cards may use their own reception units (Rx), for example, the Rx1 (e.g., the reception unit 1 in the RF transceiver in FIG. 1) of the terminal is connected to the Rx1 (e.g., the reception unit 1 of the SIM1 in the modem in FIG. 1) of the card 1 through controlling the switch, and the Rx2 of the terminal (e.g., the reception unit 2 in the RF transceiver in FIG. 1) is connected to the Rx2 (e.g., the reception unit 2 of the SIM2 in the modem in FIG. 1) of the card 2 through controlling the switch, to complete tasks in the idle state, for example, receiving paging, measuring neighboring cells, receiving system messages, etc., to achieve the purpose of dual-card and dual-standby.

However, if one of the cards (e.g., card 1, such as SIM1 in FIG. 1) is in a call or establishing a call, the card 2 is unable to interact with the network side in uplink direction since the Tx cannot be used in a time division multiplexing manner by another card (e.g., card 2, such as SIM2 in FIG. 1) during the call or when establishing the call, and in this case, the card 2 may only be in a non-service state.

In other words, in the terminal of multi-card, multi-standby and single-active, if one card occupies the Tx, for example occupying the Tx for calling, then the other cards may be in a non-service state and cannot answer a call, or transmit or receive a message, which may seriously affect the user experience.

The technical solution provided by the disclosure has the beneficial effects that: the method for network connection, the corresponding device and the electronic apparatus provided by the disclosure connect to the detected available Wi-Fi network for target identity module; and establish the IP multimedia subsystem (IMS) network connection for the target identity module based on the connected Wi-Fi network, such that the VoWi-Fi service may be used for the target identity module to ensure the communication service of the target identity module and improve the user experience.

First, several terms involved in the disclosure are introduced and explained.

1. voice over Wi-Fi (VoWi-Fi), i.e., transmitting audio over Wi-Fi network)

As the name suggests, the VoWi-Fi means a mobile communication service for transmitting audio and video over a Wi-Fi network.

Figure 2:
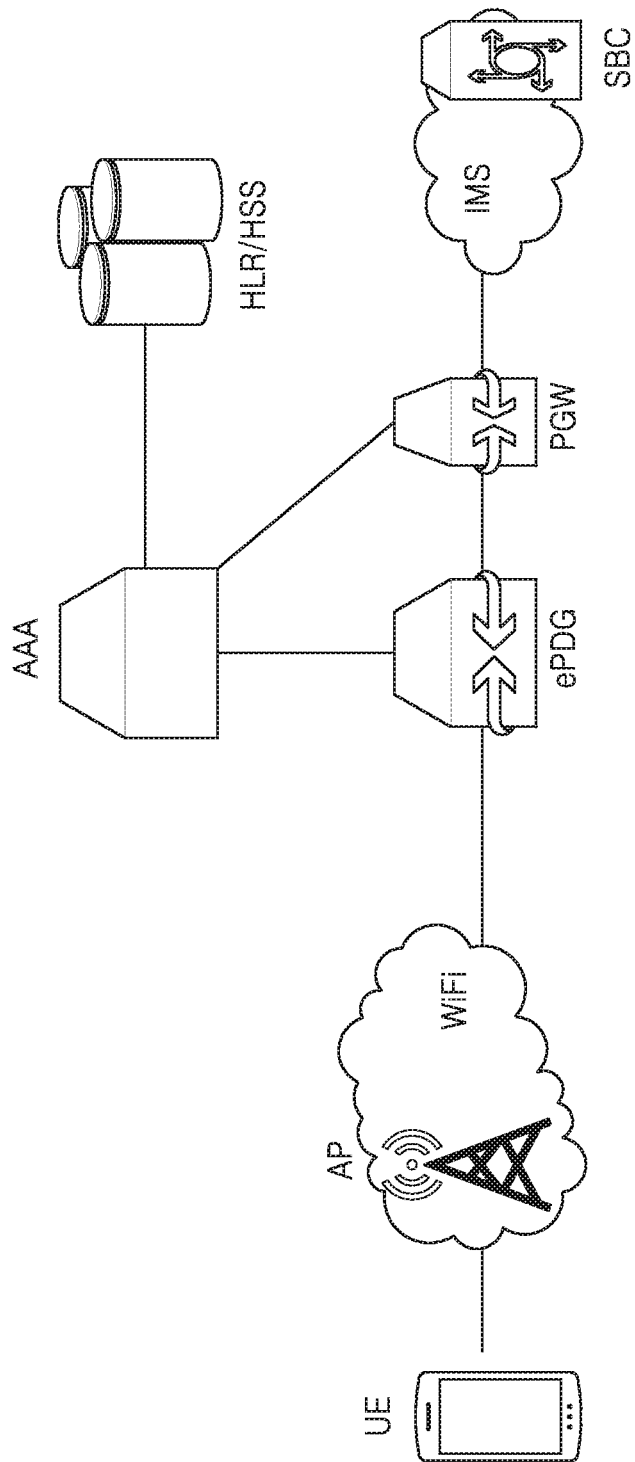
FIG. 2 is a schematic structural diagram illustrating a voice over Wi-Fi (VoWi-Fi) network according to an embodiment of the disclosure.

FIG. 2 is a schematic structural diagram illustrating a VoWi-Fi network according to an embodiment of the disclosure.

Referring to FIG. 2, a user equipment (UE), which corresponding to the terminal hereafter) is connected to a WI-FI access point (AP) via a WI-FI radio frequency unit (the RF unit not employing network standards, such as 5G/4G/3G/2G), and is connected to a Wi-Fi network via the AP.

According to an embodiment of the disclosure, the AP is connected to the IMS core network to which it belongs by means of an evolved packet data gateway (ePDG) and a packet data network gateway (PGW), and accordingly the UE may access the IMS network through the AP (i.e., through the Wi-Fi network), and perform information interaction with the IMS core network to which the UE belongs.

Wherein, an authentication authorization and accounting (AAA) server and a home location register (HLR)/home subscriber server (HSS) mainly complete functions of user authentication, authorization, bills, etc.

According to an embodiment of the disclosure, a belonging IMS core network is connected to the IMS core network to which another UE belongs through a session border controller (SBC), and the IMS core network to which another UE belongs is connected to another UE through various possible servers and gateways, thereby achieving end-to-end communication.

Accordingly, the VoWi-Fi is an IMS-based voice/video service.

2. Voice Over LTE (VoLTE), i.e., transmitting audio over LTE network)

The VoLTE means a mobile communication service for transmitting audio and video over a long term evolution (LTE) network. The VoLTE is also an IMS-based voice/video service.

Because a terminal of multi-card and single-active has only one RF TX of the mobile network, the following problems may occur:

Problem 1: if one card is used in a call or establishing a call, the RF TX will be monopolized by the calling card (that is, the card that establishes the call or is in the call), and another card cannot be reused in a time division multiplexing manner. Then, during the process of the calling card establishing a call or being a call, the non-calling card cannot interact with the network side in the uplink direction, so it may only be in a non-service state, and unable to answer the call and transmit and receive text messages, which seriously affects the user's perception.

Question Problem 2: for a non-calling card supporting the VoLTE service, if before the calling card establishes a call, the non-calling card supporting the VoLTE service is in the radio resource control (RRC) connection state, the non-calling card supporting the VoLTE service has a mismatch between the RRC state (in the connection state) on the network side and the RRC state (in the non-service state) on the terminal side, due to the phenomenon that the non-calling card is always in non-service state as the limitation of the single RF TX, and then the network side may release the evolved packet system (EPS), i.e., the LTE core network) bearer of the non-calling card supporting the VoLTE service, so that after the calling card ends the call, when the non-calling card supporting the VoLTE service attempts to establish a voice, a video call or receiving and transmitting a text message, problems, such as a delay for receiving and transmitting a text message, a call delay, a call degradation (downgrading from a high-definition voice to a normal circuit switching domain (CS) call) or even a call failure will occur.

Figure 3:
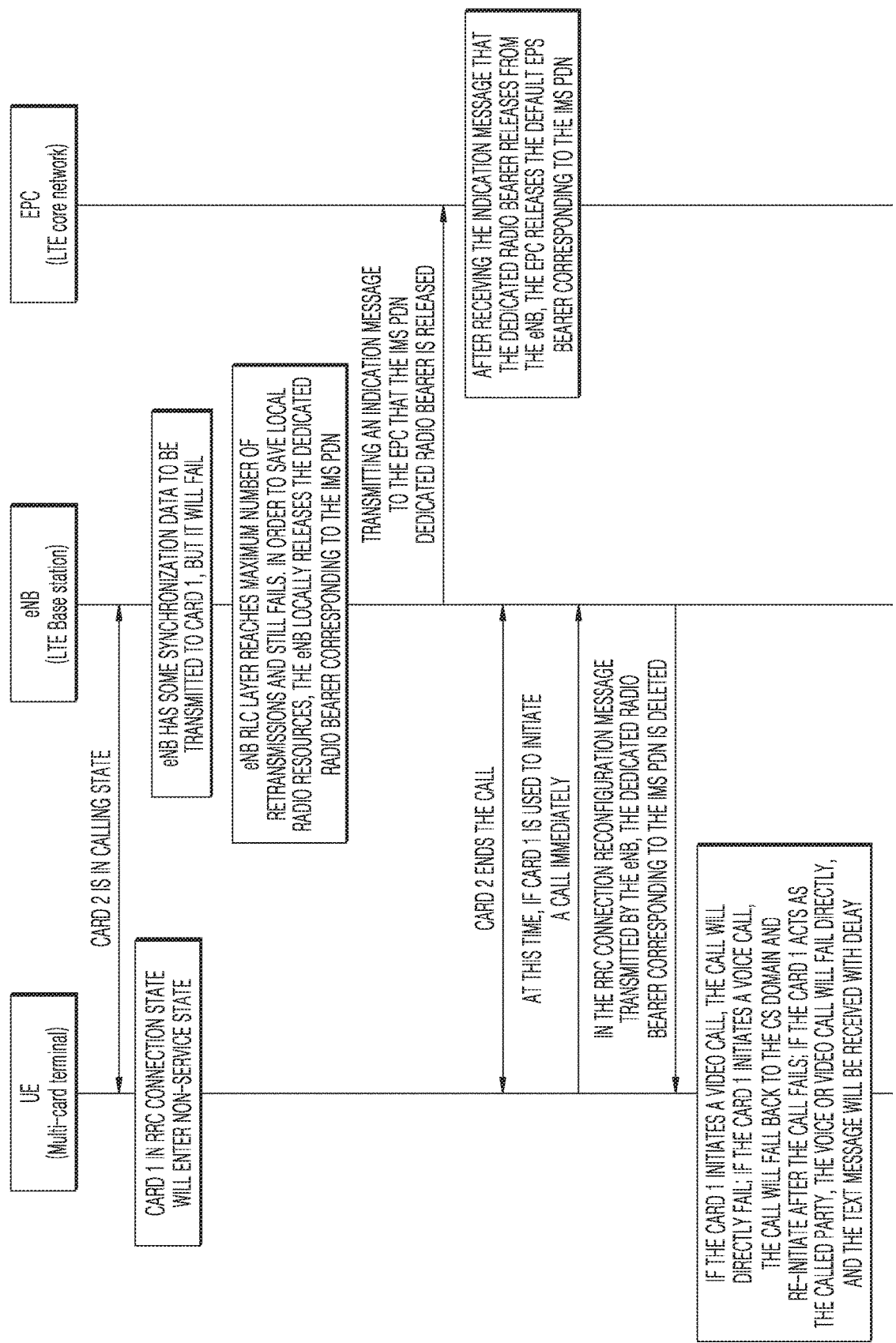
FIG. 3 is a schematic diagram illustrating a call failure generated by a non-calling card according to an embodiment of the disclosure.

FIG. 3 shows the process in which the above problem 2 occurs, taken an example wherein the card 2 is in a calling state and the card 1 is a non-calling card supporting the VoLTE service in the RRC connection state.

FIG. 3 is a schematic diagram illustrating a call failure generated by a non-calling card according to an embodiment of the disclosure.

Referring to FIG. 3, when the card 2 in the UE is in the calling state, because the card 2 occupies the Tx, the card 1 enters the non-service state. Because the card 1 is in the RRC connection state before the card 2 calling, the evolved NodeB (eNB), i.e., an LTE base station) will have some synchronization data to be transmitted to the card 1, but because the card 1 has no service, the transmission of the synchronization data of the eNB will fail. If the radio link control (RLC) layer of the eNB fails when reaching the maximum number of retransmissions, in order to save local radio resources, the eNB will release the dedicated radio bearer corresponding to the IMS packet data network (PDN). Therefore, the eNB transmits an indication message of releasing the IMS PDN dedicated radio bearer to the evolved packet core (EPC, i.e., an LTE core network). After receiving the indication message of releasing the dedicated radio bearer from the eNB, the EPC releases the default EPS bearer corresponding to the IMS PDN.

After card 2 ends a call, in the case that card 1 is used to initiate a call immediately, since the dedicated radio bearer corresponding to the IMS PDN is deleted in the RRC connection reconfiguration message transmitted by the eNB, if the card 1 initiates a video call, the video call will fail directly; if the card 1 initiates a voice call, the voice call will fall back to the CS domain and be re-initiated. If card 1 is used as the called party at this time, the voice or video call will directly fail and a text message will be delayed.

The method for network connection, corresponding device and electronic apparatus provided by the disclosure are intended to address the above technical problems in the prior art.

The technical solutions of the disclosure and how to address the above technical problems by the technical solutions of the disclosure are described in by the following specific embodiments.

Figure 4:
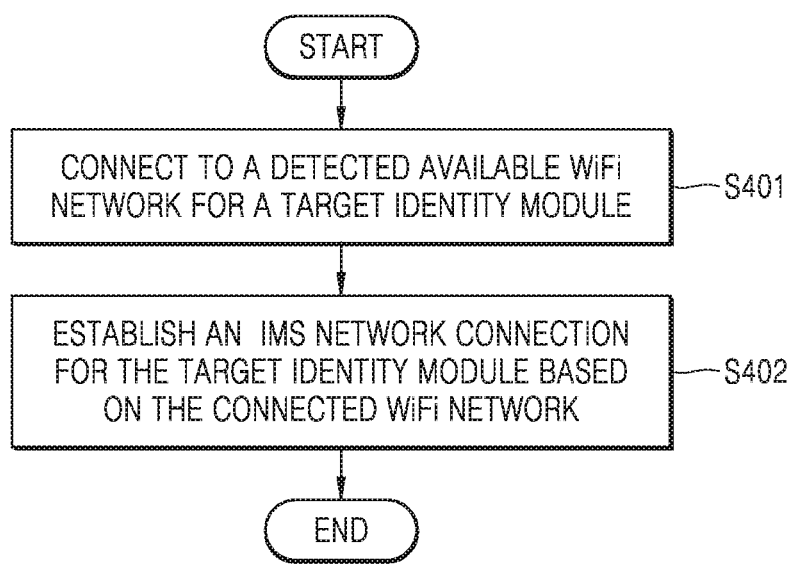
FIG. 4 is a schematic flowchart illustrating a method for network connection according to an embodiment of the disclosure.

The embodiment of the disclosure provides a method for network connection as shown in FIG. 4.

FIG. 4 is a schematic flowchart illustrating a method for network connection according to an embodiment of the disclosure.

Referring to FIG. 4, the method for network connection provided by the embodiment of the disclosure includes:

At operation S401: connecting to a detected available Wi-Fi network for a target identity module.

Wherein, the target identity module may be an identity module in the terminal, which may not access the mobile network. Wherein, when the target identity module has no available mobile networks or when the other identity module of the terminal performs a call service, the target identity module may be considered to be unable to access the mobile network. Wherein, the above call may be a video/voice call.

As an example, in the area where the user carrying the terminal enters and in which there is no mobile signal of the corresponding network standard (for example, the target identity module only supports the 3G ($3^{rd}$ generation) and 4G ($4^{th}$ generation) network standards, but enters the area with no mobile signal or only 2G ($2^{nd}$ generation) signal), or in the scenario where the user carries the terminal to roam overseas but does not apply an overseas roaming authority for the target identity module, the target identity module may be unable to access the mobile network without an available mobile network.

In another example, as may be seen from the above description, when the other identity module except the target identity module is establishing a call or is in a calling state, the Tx of the terminal is occupied, and the target identity module is in a non-service state, which means that the target identity module cannot access the mobile network.

In an embodiment of the disclosure, it may not be excluded that the target identity module has other conditions that cannot access the mobile network.

According to an embodiment of the disclosure, for the target identity module that may not access the mobile network, the terminal may connect to a detected available Wi-Fi network, including an Wi-Fi network outside the terminal (i.e., the Wi-Fi network based on the external AP connection), a Wi-Fi network connected based on a Wi-Fi hotspot inside the terminal, etc., which may not be limited to these in the disclosure.

At operation S402: establishing an IMS network connection for the target identity module based on the connected Wi-Fi network.

After the IMS network connection is successfully established, the target identity module may use the VoWi-Fi service to ensure the communication service of the target identity module and improve the user experience.

Wherein, the establishing an IMS network connection for the target identity module, includes initiating registration of the IMS network for the target identity module based on the connected Wi-Fi network, thereby establishing the network connection with the IMS network.

According to an embodiment of the disclosure, before the operation S401, the terminal needs to first detect the available Wi-Fi network, which may refer triggering the operation of detecting the available Wi-Fi network when the target identity module may unable to access the mobile network. For example, when the target identity module is unable to access the mobile network, the available Wi-Fi network may be detected for the target identity module.

According to an embodiment of the disclosure, when the target identity module may have no available mobile networks, or when the other identity module may perform a call service, the target identity module may be considered to be unable to access the mobile network at this time, and thus the available Wi-Fi network may be detected for the target identity module.

Wherein, the performing the call service may include establishing a call, being in a calling state, or the like.

Wherein, the establishing the call may include a process of establishing a call connection before ringing and a process of that, during ringing, two parties enter the calling state after the called party answering the call.

When the terminal acts as the calling party, an RRC connection establishment request message or an invite message may be transmitted to confirm the start of establishing a call. When the terminal acts as the called party, a paging response message or an invite response message may be transmitted to confirm the start of establishing a call. In other words, when the terminal transmits an RRC connection establishment request message, an invite message, a paging response message, or an invite response message for the other identity modules, it may indicate that the terminal starts to establish a call for the other identity modules, and may also be considered that the other identity modules start to establish a call.

Specifically, if the terminal acts as the calling party, when the terminal transmits an RRC connection establishment request message or an invite message to the network side for the other identity modules, it may indicate that the terminal starts to perform the call service for the other identity modules, in other words, entering the process of establishing a call connection, then the Tx of the terminal will be occupied by the other identity modules mentioned above. Wherein, if the other identity module is in the RRC idle state, the terminal may transmit an RRC connection establishment request message to the network side for the other identity modules, and if the other identity module is in the RRC connection state, the terminal may transmit an invite message to the network side for the other identity modules.

If the terminal acts as the called party, after receiving the paging message or the invite message transmitted by the network side for the other identity modules, if the paging response message or the invite response message is fed back to the network side, then it may indicate that the terminal starts to perform the call service for the other identity module mentioned above, in other words, entering the process of establishing a call connection, then the Tx of the terminal will be occupied by the other identity modules mentioned above. Wherein, if the paging message transmitted by the network side is received, the terminal may feed back the paging response message to the network side for the other identity modules, and if the invite message transmitted by the network side is received, the terminal may feed back the invite response message to the network side for the other identity modules.

According to an embodiment of the disclosure, For the case that the other identity modules perform the call service such that the target identity module is unable to access the mobile network, the target identity module may use the VoWi-Fi service by using the method for network connection provided by the embodiment of the application disclosure, in which the RF unit of the mobile network standard (2G, 3G, 4G, 5G, etc.) may not be applied since that the VoWi-Fi service uses the Wi-Fi RF unit of the terminal, such that it is not limited by the RF hardware of the single-active terminal. At this time, the identity module in the calling state occupies the RF unit of the mobile network standard, and the target identity module occupies the Wi-Fi RF unit, which may effectively address the problem that the single RF TX is unable to be multiplexed. At this time, the target identity module may also communicate with the network at any time, thereby achieving the multi-card and multi-calling function and improving the user experience.

It may be understood that the target identity module may be one or more identity modules except the identity module performing a call service in a terminal of multi-card and single-active. In other words, each identity module not performing a call service may use the method provided in the embodiment of the disclosure to communicate with the network at any time, thereby achieving the effect of multi-card and multi-calling, and greatly improving the user experience.

According to an embodiment of the disclosure in the embodiment of the application, the type of the identity module includes an entity identity card and a virtual user identity module. Specifically, the entity identity card at least includes a SIM card, a user Identity module (UIM) card, and a personal information management system (PIM) card, a universal subscriber identity module (USIM) card, a removable user identity module (RUIM) card, and the like. The virtual user identity module means that there is no physical hardware card slot or physical identity card on the terminal with respect to the physical identity card, wherein the user's identity information is may be stored in a storage area (an internal RAM or an external memory card) of the terminal. The terminal may be a mobile phone, a tablet computer, a wearable smart device, or any device with a function of being set with an identity module.

According to an embodiment of the disclosure, in operation S401, if a Wi-Fi hotspot of the other identity module (for example, the other identity module performing a call service, or the other identity module enabling overseas roaming authority, etc.) is being shared, the terminal may simultaneously detect an Wi-Fi AP outside the terminal or an Wi-Fi hotspot inside the terminal for the target identity module, and may select an appropriate Wi-Fi AP in the detected external Wi-Fi AP and the Wi-Fi hotspot inside the terminal to connect to the Wi-Fi network in operation S402, which may be selected according to, for example, signal strength, signal reception quality, and the like, and may also be set by those skilled in the art according to actual situations which is not limited by the embodiment of the disclosure. For the target identity module, the selected Wi-Fi may be connected and IMS registration may be initiated.

According to an embodiment of the disclosure, in operation S401, if the other identity module performing a call service does not currently support concurrency of circuit domain service and data domain service (for example, the other identity module performing a call service only supports 2G network or is in a 2G network area, and the above 2G network does not support a dual transfer mode (DTM)), the terminal may detect only the Wi-Fi AP outside the terminal for the target identity module, and may connect to the Wi-Fi network through an external AP and initiate IMS registration for the target identity module in operation S402.

According to an embodiment of the disclosure, in operation S401, if the other identity module performing a call service supports a concurrent network of a circuit domain service and a data domain service (for example, a network, such as 3G, 4G, 5G, etc.), the terminal may directly detect a Wi-Fi hotspot of the other identity module, and connect to the Wi-Fi network based on the detected Wi-Fi hotspot of the other identity module for the target identity module. Or, in another possible implementation, the terminal may directly enable a Wi-Fi hotspot of the other identity module; and detect the Wi-Fi hotspot of the other identity module for the target identity module. In operation S402, for the target identity module, the Wi-Fi hotspot may be connected, the Wi-Fi network may be connected through the Wi-Fi hotspot and the IMS registration may be initiated. In other words, the other identity module may share a data service with the target identity module through the Wi-Fi hotspot even when performing a call service, which expanding the scenario in which the user uses the VoWi-Fi function, and improving the usage experience of the user.

According to an embodiment of the disclosure, in operation S401, the terminal may first scan the available Wi-Fi network for the target identity module. When there is an available Wi-Fi network, in operation S402, for the target identity module, the available Wi-Fi network may be connected and IMS registration may be initiated, that is, establishing a connection with the IMS network. When there is no available Wi-Fi AP outside the terminal, the terminal may enable the Wi-Fi hotspot of the other identity module, and detect the Wi-Fi hotspot of the other identity module for the target identity module. In operation S402, for the target identity module, the Wi-Fi hotspot of the other identity module may be connected and the IMS registration may be initiated.

After the target identity module registers the IMS successfully, even if the other identity module is in the calling state, the target identity module may also able to transmit and receive services, such as a voice/video call, a text message, and the like, which breaks through the limitation of the single RF TX of the hardware, and addresses the above problem 1, thereby achieving the effect of multi-card and multi-calling, and the user may not miss the video/voice call, thereby greatly enhancing the user experience.

According to an embodiment of the disclosure, for terminal of dual-card and single VoLTE, if the card 2 works in the 3G/2G mode or the circuit switched fallback (CSFB) mode, when the card 2 is in the process of establishing a call or in a calling state, the terminal may attempt to connect to an available external WI-FI AP for the card 1 and attempt to register the IMS service based on the Wi-Fi network. After the card 1 registers the IMS successfully, even if the card 2 is performing the call service, the card 1 may also able to transmit and receive services, such as a voice/video call and a text message, which successfully breaks through the limitation of the single RF TX of the hardware, thereby achieving the purpose of dual-card and dual-calling, and greatly improving the user experience.

According to an embodiment of the disclosure, for a terminal of dual-card and dual VoLTE, as long as any one card (calling card) performs a call service, the terminal may attempt to connect to an available external WI-FI AP for the other card (non-calling card), and attempt to register an IMS service based on the WI-FI network. After the non-calling card successfully registers the IMS, when the calling card performs a call service, the non-calling card may also able to transmit and receive services, such as a voice/video call and a text message, thereby achieving the purpose of dual-card and dual-calling, and greatly improving the user experience.

More particularly, in the above two cases, if there is no available external Wi-Fi AP for connection, the data card (the card has activated the data service) of the terminal of dual-card may share a data service with the other card through the Wi-Fi hotspot. In this way, the terminal may connect to the Wi-Fi hotspot for the other card and attempt to register an IMS service. After the card successfully registers the IMS, even when the data card performs the call service, the other card may able to transmit and receive services, such as a voice/video call and a text message, thereby achieving the purpose of dual-card and dual-calling, and improving the user experience.

The embodiment of the disclosure further provides a possible implementation, if the target identity module supports the VoLTE service, then the method for network connection provided by the embodiment of the disclosure may simultaneously perform the following processes:

At operation SA: detecting whether the target identity module is in the RRC connection state, before the other identity module establishing a call.

In the actual application, in addition to the VoLTE service, the method provided in this embodiment of the disclosure may be used as long as the network service needs to perform the RRC connection.

It may be seen from the above that when the target identity module is in the RRC connection state, the other identity module performing the call service may cause the EPS bearer of the target identity module to be released, resulting that the target identity module attempts to establish a voice, video call, or transmit and receive a text message after the other identity module ends the call, which may cause problems, such as a delay of receiving and transmitting a text message, a call delay, a call degradation, or even a call failure.

For this problem, in the embodiment of the disclosure, the terminal may detect whether the target identity module is in the RRC connection state before the other identity module establishing a call, so as to take corresponding preventive measures.

Wherein, that before establishing a call, means that before establishing a call connection. When the terminal acts as the calling party, the RRC connection establishment request message or the invite message may be transmitted to confirm the start of establishing the call, and when the terminal acts as the called party, the paging response message or the invite response message is may be transmitted to confirm the start of establishing the call. Therefore, before the terminal transmits the RRC connection establishment request message, the invite message, the paging response message, or the invite response message to the network side for the other identity module, the terminal may detects whether the target identity module is in the RRC connection state.

Specifically, if the terminal acts as the calling party, when the terminal transmits the RRC connection establishment request message or the invite message to the network side, it may indicate that the terminal starts to establish a call connection for the other identity module mentioned above, and then the Tx of the terminal will be occupied by the other identity module mentioned above. Therefore, after detecting a call request of the user, and before transmitting the RRC connection establishment request message or the invite message to the network side, the terminal may detect whether the target identity module is in the RRC connection state.

If the terminal acts as the called party, after receiving the paging message or the invite message transmitted by the network side for the other identity module, if the paging response message or the invite response message is fed back to the network side, it may indicate that the terminal starts to establish a call connection for the other identity module mentioned above, and then the Tx of the terminal will be occupied by the other identity module mentioned above. Therefore, after receiving the paging message or the invite message transmitted by the network side for the other identity module, and before feeding back the paging response message or the invite response message to the network side, the terminal may detect whether the target identity module is in the RRC connection state.

At operation SB: migrating the RRC state of the target identity module in the RRC connection state to the idle state, or synchronizing with the network side for the EPS context state of the target identity module in the RRC connection state.

Specifically, before the other identity module establishing a call, the RRC state of the target identity module in the RRC connection state may be migrated to the idle state;

When the target identity module is in the RRC connection state, the non-service state of the target identity module may cause a mismatch between the RRC state of the network side and the RRC state of the terminal side, thereby causing the network side to release the EPS bearer of the target identity module. Therefore, in the embodiment of the disclosure, the RRC state of the target identity module in the RRC connection state may be migrated to the idle state. In this way, before the other identity module establishing a call, the RRC states of the network side and the terminal may consistent, i.e., both in the idle state, thereby avoiding the problem that the target identity module failure to retransmit RLC resulting that the EPS bearer to be released during the other identity module performing a call service. After the other identity module ends the call, the target identity module may immediately initiate or receive services, such as a VoLTE voice/video call, a text message, or etc.

When the terminal detects that the target identity module is in the RRC connection state before the terminal transmits an RRC connection establishment request message, an invite message, a paging response message, or an invite response message to the network side for the other identity module mentioned above, then the terminal may migrate the RRC state of the target identity module in the RRC connection state to the idle state, and transmit the RRC connection establishment request message, the invite message, the paging response message, or the invite response message to the network side.

Specifically, if the terminal acts as the calling party, after detecting the user's call request, and before transmitting the RRC connection establishment request message or the invite message to the network side, if the terminal detects that the target identity module is in the RRC connection state, the terminal may migrate the RRC state of the target identity module in the RRC connection state to the idle state, and then transmit the RRC connection establishment request message or the invite message to the network side.

If the terminal acts as the called party, after receiving the paging message or the invite message transmitted by the network side for the other identity module, and before feeding back the paging response message or the invite response message to the network side, if the terminal detects the target identity module is in the RRC connection state, the terminal may migrate the RRC state of the target identity module in the RRC connection state to the idle state, and then feed the paging response message or the invite response message back to the network side.

According to an embodiment of the disclosure, the target identity module may perform a network interaction procedure to enable the target identity module to be switched from the RRC connection state to the RRC idle state in this process. When triggering the RRC state of the target identity module being migrated from the connection state to the idle state, the RRC states of the network side and the terminal may be quickly achieved consistently.

As an example, a tracking area update (TAU) process may be initiated for the target identity module in the RRC connection state, such that the network side releases the RRC connection of the target identity module in the RRC connection state, which may trigger the RRC of the target identity module to enter the idle state.

Specifically, the terminal may transmit the TAU Request message to the network side for the target identity module, wherein the TAU request message carries information, such as a local location area (or tracking area) identifier, a network-assigned terminal temporary identifier, a local EPS context state and the like. After receiving the TAU Request message, the network side may return a TAU accept message while releasing the RRC connection of the target identity module. After completing the TAU process for the target identity module, the network side will release the RRC connection, and the target identity module enters the RRC idle state.

In an embodiment of the disclosure, the network interaction process that may be initiated may not be limited to the TAU process, and any network interaction process that may convert the target identity module from the RRC connection state to the RRC idle state may belong to the spirit or scope of the disclosure.

According to an embodiment of the disclosure, after operation SB, the other identity module may establish a call, that is, establishing a call connection, for example, transmitting an RRC connection establishment request message, an invite message, a paging response message, or an invite response message to the network side for the other identity module. In the process of performing the call service by the other identity module, the RRC state of the network side corresponding to the target identity module may consistent with the RRC state of the terminal, i.e., both in the idle state, so that the network side will not be triggered to release the EPS bearer of the target identity module. Then, after the other identity module ends the call, the target identity module may establish a VoLTE call without delay, which may address the above problem 2.

In an embodiment of the disclosure, it may also be that the network side is synchronized for the EPS context state of the target identity module in the RRC connection state, after the other identity module ends the call.

When the target identity module is in the RRC connection state, the non-service state of the target identity module may enables the network side to release the EPS bearer of the target identity module, thereby resulting the case that a delay of transmitting and receiving a text message, a call delay, a call degradation, or even a call failure for the target identity module after the other identity module ends a call. Therefore, in the embodiment of the application disclosure, the network side may be synchronized for the EPS context state of the target identity module in the RRC connection state. In this way, after the other identity module ends the call, the terminal side and the network side may quickly perform synchronization for the EPS context state of the target identity module, and the target identity module may immediately initiate or receive services, such as a VoLTE voice/video call, a text message, etc.

According to an embodiment of the disclosure, during the process, the TAU process may be initiated for the target identity module in the RRC connection state, such that the network side indicates the corresponding EPS context state.

In other words, after the other identity module ends a call, the terminal immediately may initiate one TAU process for the target identity module. The TAU process may be mainly used to align the EPS context states of the terminal side and the network side for the target identity module.

Specifically, the terminal may transmit the TAU request message to the network side for the target identity module, wherein the TAU request message may carry information, such as a local location area (or tracking area) identifier, a network-assigned terminal temporary identifier, a local EPS context state and the like. After receiving the TAU request message, the network side may check a local EPS context state, and if the local EPS context state does not match an EPS context state of the target identity module reported by the terminal (e.g., the IMS PDN state is identified as a deactivation state in the network side but is identified as an activation state in the local terminal), then the corresponding EPS context state may be set to 0 in the TAU accept message returned to the terminal, that is, the EPS context state of the current IMS PDN may be indicated as the deactivation state.

For the terminal, when the TAU accept message fed back by the network side indicates that the EPS context state of the target identity module is the deactivation state, the IMS network connection for the target identity module in the RRC connection state may be established.

Wherein, the process of IMS network connection may include an IMS PDN activation process and an IMS registration process.

In the embodiment of the disclosure, after receiving the TAU accept message indicating that the EPS context state of the IMS PDN of the network side for the target identity module is the deactivation state, the terminal may initiate the IMS PDN activation process and the IMS registration process to align the EPS context states between the terminal side and the network side, such that the target identity module may then establish a VoLTE call without delay, which may also address the above problem 2.

The method for network connection provided by the embodiment of the application disclosure, in the case of the other identity module performing the call service, uses the VoWi-Fi service for the target identity module to ensure the communication service of the target identity module; and for the case of the target identity module supporting the VoWi-Fi service, before the other identity module establishing a call, if detecting that the target identity module is in the RRC connection state, the RRC state of the target identity module in the RRC connection state may be migrated to the idle state, or the terminal side and the network side performs synchronization for the EPS context state of the target identity module in the RRC connection state, such the target identity module is capable of establishing a VoLTE call without delay after the other identity module ends the call, thereby significantly improving the user experience.

Figure 5:
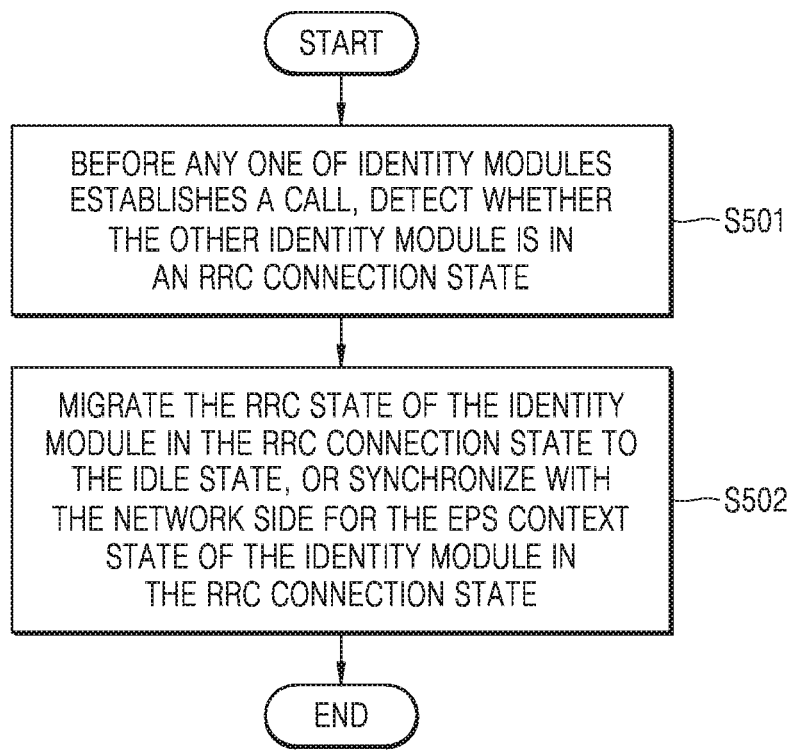
FIG. 5 is a schematic flowchart diagram illustrating another method for network connection according to an embodiment of the disclosure.

According to an embodiment of the disclosure, a method for network connection is further provided as shown in FIG. 5.

FIG. 5 is a schematic flowchart diagram illustrating a method for network connection according to an embodiment of the disclosure.

At operation S501: detecting whether the other identity module is in the RRC connection state, before any one of the identity modules establishing a call;

According to an embodiment of the disclosure, the method provided by the embodiment of the disclosure may be employed for the VoLTE service or other network services that need to perform the RRC connection.

It may be seen from the above that when the identity module supporting VoLTE service is in the RRC connection state, any one of the other identity modules performing the call service may cause the EPS bearer of the above identity module in the RRC connection state to be released, resulting that the identity module originally in the RRC connection state attempts to establish a voice or video call, or transmit or receive a text message after the any one of identity modules ends the call, which may cause problems, such as a delay of receiving and transmitting a text message, a call delay, a call degradation, or even a call failure.

For this problem, in the embodiment of the disclosure, the terminal may detect whether the other identity module is in the RRC connection state before the any one of the identity modules establishes a call, so as to take corresponding preventive measures.

Wherein, before establishing a call means that before establishing a call connection. When the terminal acts as the calling party, the terminal may transmit the RRC connection establishment request message or the invite message to confirm the start of establishing the call, and when the terminal acts as the called party, the terminal may transmit the paging response message or the invite response message to confirm the start of establishing the call. Therefore, before the terminal transmits the RRC connection establishment request message, the invite message, the paging response message, or the invite response message to the network side for any one of the identity modules, the terminal may detect whether the other identity module is in the RRC connection state.

Specifically, if the terminal acts as the calling party, when the terminal transmits an RRC connection establishment request message or an invite message to the network side for the any one of the identity modules, it may indicate that the terminal starts to establish a call connection for the any one of identity modules, and then the Tx of the terminal will be occupied. Therefore, after detecting the call request of the user, and before transmitting the RRC connection establishment request message or the invite message to the network side, the terminal may detect whether the other identity module is in the RRC connection state.

If the terminal acts as the called party, after receiving the paging message or the invite message transmitted by the network side for any one of the identity modules, if the paging response message or the invite response message may be fed back to the network side, it may indicate that the terminal starts to establish a call connection for the any one of the identity modules, and then the Tx of the terminal will be occupied. Therefore, after receiving the paging message or the invite message transmitted by the network side for any one of the identity modules, and before feeding back the paging response message or the invite response message to the network side, the terminal may detect whether the other identity module is in the RRC connection state.

At operation S502: migrating the RRC state of the identity module in the RRC connection state to the idle state, or synchronizing with the network side for the EPS context state of the identity module in the RRC connection state.

Specifically, before any one of the identity modules establishing a call, the RRC state of the identity modules in the RRC connection state may be migrated to an idle state;

According to an embodiment of the disclosure, when the identity module is in the RRC connection state, the non-service state of the identity modules resulting from the other identity module performing a call service may cause a mismatch between the RRC state of the network side and the RRC state of the terminal side, thereby causing the network side to release the EPS bearer of the target identity module. Therefore, in the embodiment of the application, the RRC state of the identity module (referred to as the target identity module hereafter for convenient description) in the RRC connection state may be migrated to the idle state. In this way, before any one of the identity modules establishing a call, the RRC states of the network side and the terminal may consistent, i.e., both in the idle state, thereby avoiding the problem that the any one of the identity modules fails to retransmit RLC resulting that the EPS bearer to be released during any one of identity modules performing a call service. After the any one of the identity modules ends the call, the target identity module may immediately initiate or receive services, such as a VoLTE voice/video call, a text message, or etc.

When the terminal detects that the other identity module is in the RRC connection state before the terminal transmits an RRC connection establishment request message, an invite message, a paging response message, or an invite response message to the network side for any one of the identity module, then the terminal may migrate the RRC state of the target identity module in the RRC connection state to the idle state, and transmit the RRC connection establishment request message, the invite message, the paging response message, or the invite response message to the network side.

Specifically, if the terminal acts as the calling party, after detecting the user's call request, and before transmitting the RRC connection establishment request message or the invite message to the network side, if the terminal detects that the other identity module is in the RRC connection state, the terminal may migrate the RRC state of the target identity module in the RRC connection state to the idle state, and then transmit the RRC connection establishment request message or the invite message to the network side.

If the terminal acts as the called party, after receiving the paging message or the invite message transmitted by the network side for any one of the identity module, and before feeding back the paging response message or the invite response message to the network side, if the terminal detects the other identity module is in the RRC connection state, the terminal may migrate the RRC state of the target identity module in the RRC connection state to the idle state, and then feed the paging response message or the invite response message back to the network side.

According to an embodiment of the disclosure, the target identity module performs a network interaction process to enable the target identity module to be switched from the RRC connection state to the RRC idle state in this process. When triggering the RRC state of the target identity module being migrated from the connection state to the idle state, the RRC states of the network side and the terminal may be quickly achieved consistently.

As an example, a TAU process may be initiated for the identity module in the RRC connection state, such that the network side releases the RRC connection of the identity module (which may be referred to as the target identity module) in the RRC connection state, which may trigger the RRC of the identity module in the RRC connection state to enter the idle state.

Specifically, the terminal may transmit the TAU request message to the network side for the target identity module, wherein the TAU request message may carry information, such as a local location area (or tracking area) identifier, a network-assigned terminal temporary identifier, a local EPS context state, and the like. After receiving the TAU request message, the network side may return a TAU accept message while releasing the RRC connection of the target identity module. After completing the TAU process for the target identity module, the network will release the RRC connection, and the target identity module may be in the RRC idle state.

According to an embodiment of the disclosure, the network interaction process that may be initiated may not be limited to the TAU process, and any network interaction process that may convert the target identity module from the RRC connection state to the RRC idle state may belong to the spirit or scope of the application.

In the embodiment of the application disclosure, after operation S502, the any one of the identity modules establishes a call, that is, establishing a call connection, for example, transmitting an RRC connection establishment request message, an invite message, a paging response message, or an invite response message to the network side for the any one of the identity modules. In the process of performing the call service by the any one of the identity modules, the RRC state of the network side corresponding to the target identity module may be consistent with the RRC state of the terminal side, both in the idle state, so that the network side will not be triggered to release the EPS bearer of the target identity module. Then, after the any one of the identity modules ends the call, the target identity module may establish a VoLTE call without delay, which may address the above problem 2.

In the embodiment of the disclosure, it may also be that the terminal side and the network side may perform synchronization for the EPS context state of the identity modules in the RRC connection state after any one of identity modules ends the call.

When the identity module (referred to as the target identity module in the following description for convenient description) is in the RRC connection state, the non-service state of the target identity modules resulting from the other identity modules performing a call service may cause the network side to release the EPS bearer of the target identity module, thereby resulting the case that a delay of transmitting and receiving a text message, a call delay, a call degradation, or even a call failure for the target identity module after the other identity module ends a call. Therefore, in the embodiment of the disclosure, the network side may be synchronized for the EPS context state of the target identity module in the RRC connection state. In this way, after the any one of the identity modules ends the call, the terminal side and the network side may quickly synchronize the EPS context states of the target identity module, and the target identity module in the RRC connection state may immediately initiate or receive services, such as a VoLTE voice/video call, a text message, etc.

According to an embodiment of the disclosure, during the process, the TAU process may be initiated for the identity modules in the RRC connection state, such that the network side indicates the corresponding EPS context state.

In other words, after the any one of the identity modules ends a call, the terminal immediately may initiate one TAU process for the target identity module. The TAU process is mainly used to align the EPS context states of the terminal side and the network side for the target identity module.

Specifically, the terminal may transmit the TAU request message to the network side for the target identity module, wherein the TAU request message may carry information, such as a local location area (or tracking area) identifier, a network-assigned terminal temporary identifier, a local EPS context state and the like. After receiving the TAU request message, the network side may check a local EPS context state, and if the local EPS context state does not match the EPS context state of the target identity module reported by the terminal (e.g., the IMS PDN state is identified as a deactivation state in the network side but is identified as an activation state in the local terminal), then the corresponding EPS context state may be set to 0 in the TAU accept message returned to the terminal, that is, the EPS context state of the current IMS PDN is indicated as the deactivation state.

For the terminal, when the TAU accept message fed back by the network side indicates that the EPS context state of the target identity module is the deactivation state, the IMS network connection for the target identity module may be established.

Wherein, the process of IMS network connection may include an IMS PDN activation process and an IMS registration process.

In the embodiment of the disclosure, after receiving the TAU accept message indicating that the EPS context state of the IMS PDN of the network side for the target identity module is the deactivation state, the terminal may initiate the IMS PDN activation process and the IMS registration process to align the EPS context states between the terminal side and the network side, then the target identity module may establish a VoLTE call without delay, which may also address the above problem 2.

In the method for network connection provided by the embodiment of the disclosure, before any one of the identity modules establishing a call, by detecting whether the other identity module is in the RRC connection state; migrating the RRC state of the identity module in the RRC connection state to the idle state, or synchronizing the network side for the EPS context state of the identity module in the RRC connection state, such that the target identity module is capable of establishing a VoLTE call without delay after any one of identity module ends the call, thereby significantly improving the user experience.

According to an embodiment of the disclosure, for a terminal of dual-card and dual-VoLTE, if the calling card receives the user's call request, and the non-calling card is in the RRC connection state, that is, the non-calling card is in the RRC connection state before the calling card establishing the call, then the RRC of the non-calling card may be triggered, by the TAU process, to enter the idle state, and then the call may be established for the calling card. In this way, the RRC states of the network side and the terminal side for the non-calling card may be consistent, thereby avoiding the EPS bearer release problem caused by the failure of the RLC retransmission in the process of performing the call service. In this way, after the calling card ends the call, the non-calling card may immediately initiate or receive services, such as a VoLTE voice/video call, a text message or the like.

According to an embodiment of the disclosure, when the non-calling card is in the RRC connection state before the calling card establishes the call, the non-calling card may immediately initiate one TAU process after the calling card ends the call. The TAU request message carries the state of the local EPS context so as to synchronize with the network side for the EPS context state. If the EPS context states of the terminal and the network side for the non-calling card do not match (e.g., the IMS PDN state is identified as a deactivation state in the network side but is identified as an activation state in the local terminal), the terminal should immediately initiate the IMS PDN activation process and then register the IMS service. In this way, the non-calling card may also initiate or receive services, such as a VoLTE voice/video call, a text message, or the like.

The terminal of dual-card and single-active is taken as an example to describe several application scenarios of the methods for network connection provided by the embodiment of the application. Those skilled in the art may understand that the method for network connection provided by the embodiment of the disclosure may also be applied to other scenarios, which are merely illustrative and are not to be construed as limitation of the disclosure.

Application Scenario 1

In this application scenario 1, the terminal may be a terminal of dual-card, dual-standby, single-active and single VoLTE, wherein, only the card 1 supports the VoLTE service, the card 1 works in the VoLTE mode, and the card 2 works in the 3G/2G mode.

Figure 6:
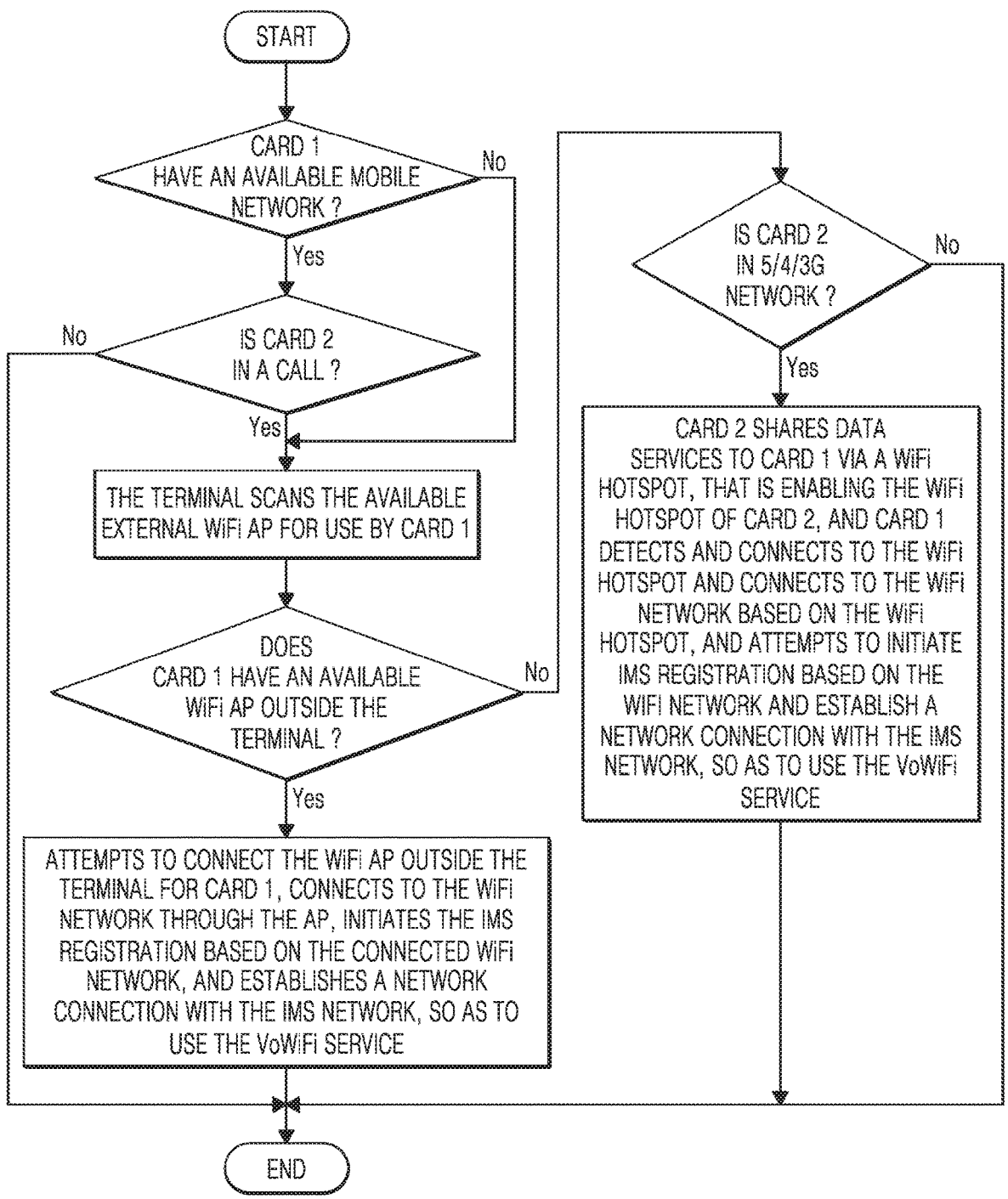
FIG. 6 is a schematic diagram illustrating application scenario 1 according to an embodiment of the disclosure.

FIG. 6 is a schematic diagram illustrating application scenario 1 according to an embodiment of the disclosure.

Referring to FIG. 6, if the card 1 has no available mobile network (e.g., a scenario of entering an area without mobile signals or overseas roaming without the overseas roaming authority), or the card 1 has a mobile network available but the card 2 is performing a call service (e.g., establishing a call, or being in a call, an example of being in a call is illustrated in FIG. 6), the terminal may first attempt to scan an available Wi-Fi AP network outside the terminal for the card 1 in this case, and if there is a Wi-Fi AP outside the terminal that may be used by the card 1, then the terminal may attempt to connect to the Wi-Fi AP outside the terminal for the card 1, connect to the Wi-Fi network through the AP, initiate the IMS registration based on the connected Wi-Fi network, and then establish a network connection with the IMS network, so as to use the VoWi-Fi service, thereby achieving the purpose of dual-card and dual calling.

If there is no Wi-Fi outside the terminal that may be used by the card 1 after scanning, if the card 2 is in the 5G/4G/3G network, the card 2 may share data services to the card 1 via a Wi-Fi hotspot, that is enabling the Wi-Fi hotspot of the card 2, even if the card 2 is performing a call service since the 5G/4G/3G network may support the concurrency of the circuit domain service and the data domain service, and the card 1 may detect and connect to the Wi-Fi hotspot and connect to the Wi-Fi network based on the Wi-Fi hotspot, and attempt to initiate the IMS registration based on the Wi-Fi network, and establish a network connection with the IMS network, so as to use the VoWi-Fi service, thereby achieving the purpose of dual-card and dual calling.

Application Scenario 2

In this application scenario 2, the terminal may be a terminal of dual-card, dual-standby, single-active and dual-VoLTE, wherein, both the two cards support the VoLTE service, and the card 1 and the card 2 both work in the VoLTE mode.

Figure 7:
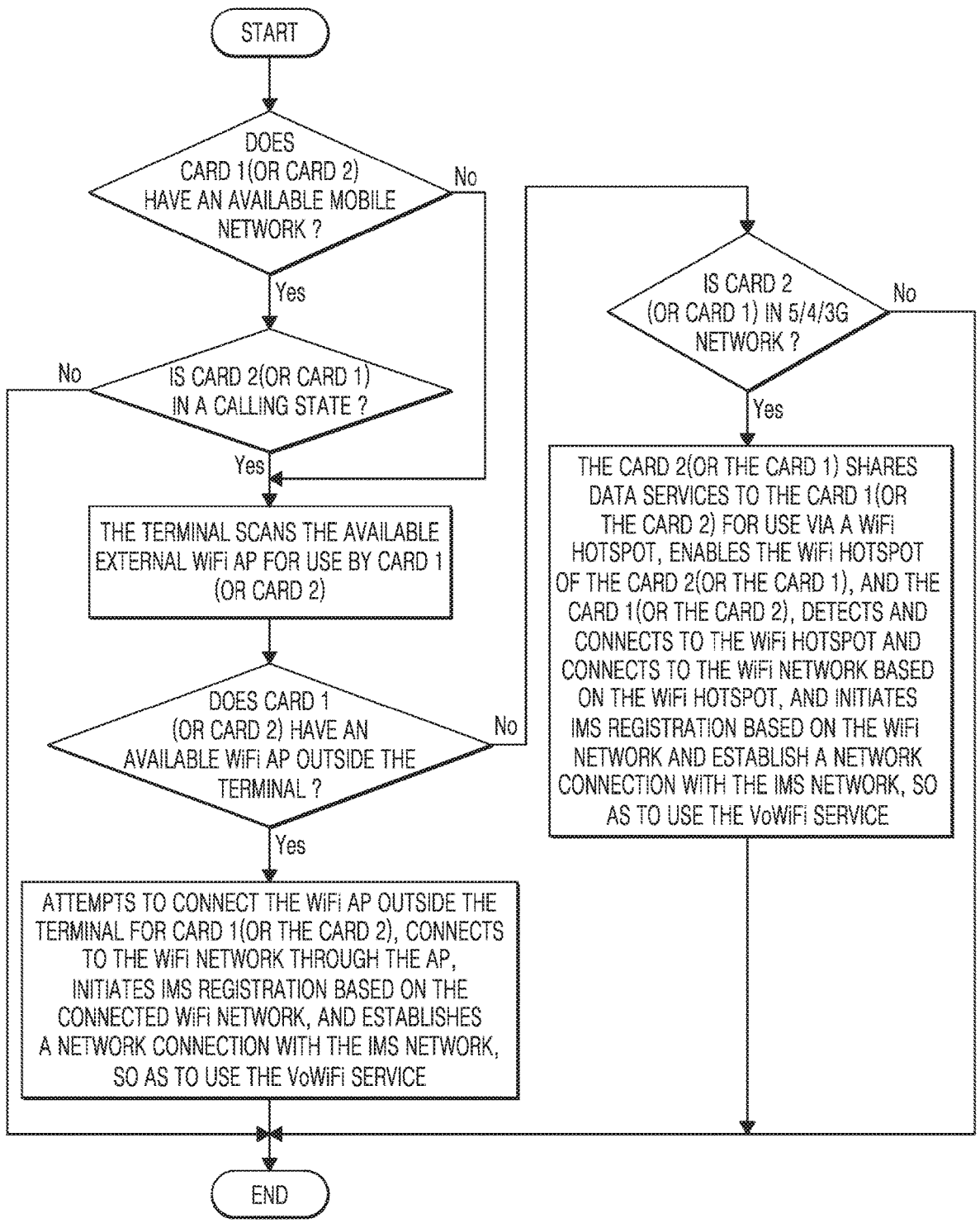
FIG. 7 is a schematic diagram illustrating application scenario 2 according to an embodiment of the disclosure.

FIG. 7 is a schematic diagram illustrating application scenario 2 according to an embodiment of the disclosure.

Referring to FIG. 7, if the card 1 (or the card 2) has no available mobile (5G/4G/3G/2G, etc.) network (e.g., a scenario of entering an area without mobile signals or overseas roaming without the overseas roaming authority), or the card 1 (or the card 2) has a mobile network available but the card 2 (or the card 1) is performing a call service (e.g., establishing a call, or being in a call (which is also referred to as being in a call state) which is illustrated as an example in FIG. 7), in this case, the terminal may first attempt to scan an available Wi-Fi AP outside the terminal for the card 1 (or the card 2), and if there is a Wi-Fi AP outside the terminal that may be used by the card 1 (or the card 2), then the terminal attempts to connect to the Wi-Fi AP outside the terminal for the card 1 (or the card 2), connects to the Wi-Fi network through the AP, initiates the IMS registration based on the connected Wi-Fi network, and then establishes a network connection with the IMS network, so as to use the VoWi-Fi service, thereby achieving the purpose of dual-card and dual calling.

If there is no Wi-Fi AP outside the terminal that may be used by the card 1 (or the card 2) after scanning, if the card 2 (or the card 1) is in the 5G/4G/3G network at this time, the card 2 (or the card 1) may also share data services to the card 1 (or the card 2) for use via a Wi-Fi hotspot even in the calling state, enable the Wi-Fi hotspot of the card 2 (or the card 1) since the 5G/4G/3G network may support the concurrency of the circuit domain service and the data domain service, and the card 1 (or the card 2) may detect and connect to the Wi-Fi hotspot, and connect to the Wi-Fi network based on the Wi-Fi hotspot, and attempt to initiate the IMS registration based on the Wi-Fi network, and establish a network connection with the IMS network, so as to use the VoWi-Fi service, thereby achieving the purpose of dual-card and dual calling.

Application Scenario 3

In this application scenario 3, the terminal may be a terminal of dual-card, dual-standby, single-active, and single (or dual) VoLTE, wherein the card 1 supports the VoLTE service, and the card 2 does not work in the VoWi-Fi mode.

Figure 8:
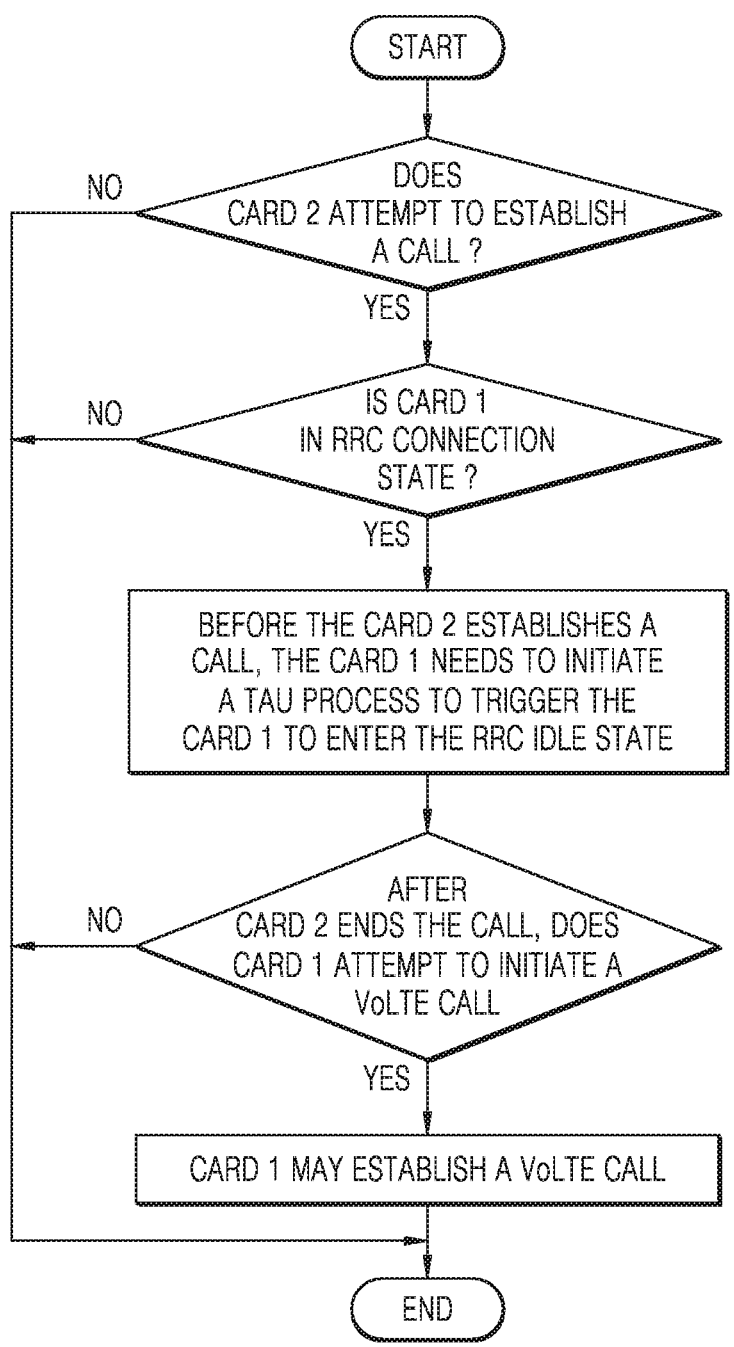
FIG. 8 is a schematic diagram illustrating application scenario 3 according to an embodiment of the disclosure.

FIG. 8 is a schematic diagram illustrating application scenario 3 according to an embodiment of the disclosure.

Referring to FIG. 8, before the card 2 establishes a call, if the terminal receives a call request from the user for the card 2 or receives a paging message or an invite message transmitted by the network side, it indicates that the card 2 may attempt to establish a call. At this time, the terminal may first detect whether the card 1 is in the RRC connection state, and if the card 1 is in the RRC connection state, the card 1 may initiate a process of triggering the RRC state from the connection state to the idle state before the card 2 establishes a call, for example a TAU process (but not limited to the TAU process), that is, the card 1 may initiate the TAU process to trigger the card 1 to enter the RRC idle state. Taking the TAU process as an example, the terminal may transmit a TAU request message to the network, wherein the TAU request message may carry information, such as a local location area (or tracking area) identifier, a network-assigned terminal temporary identifier, a local EPS context state, and the like. After receiving the TAU request message, the network may return a TAU accept message while releasing the RRC connection of the card 1. After the card 1 completes the TAU process, the card 1 will be in the RRC idle state, and then establish a call for the card 2, for example, transmitting, to the network side, an RRC connection establishment request message, an invite message, a paging response message, an invite response message, and the like. In the process of performing the call service by the card 2, the RRC state of the network for the card 1 is consistent with the RRC state of the terminal side, so that the network side is not triggered to release the EPS bearer of the card 1. Then, after the card 2 ends the call, the card 1 may establish a VoLTE call without delay.

Application Scenario 4

In this application scenario 4, the terminal may be a terminal of dual-card, dual-standby, single-active, and single (or dual) VoLTE, wherein the card 1 supports the VoLTE service, and the card 2 does not work in the VoWi-Fi mode.

Figure 9:
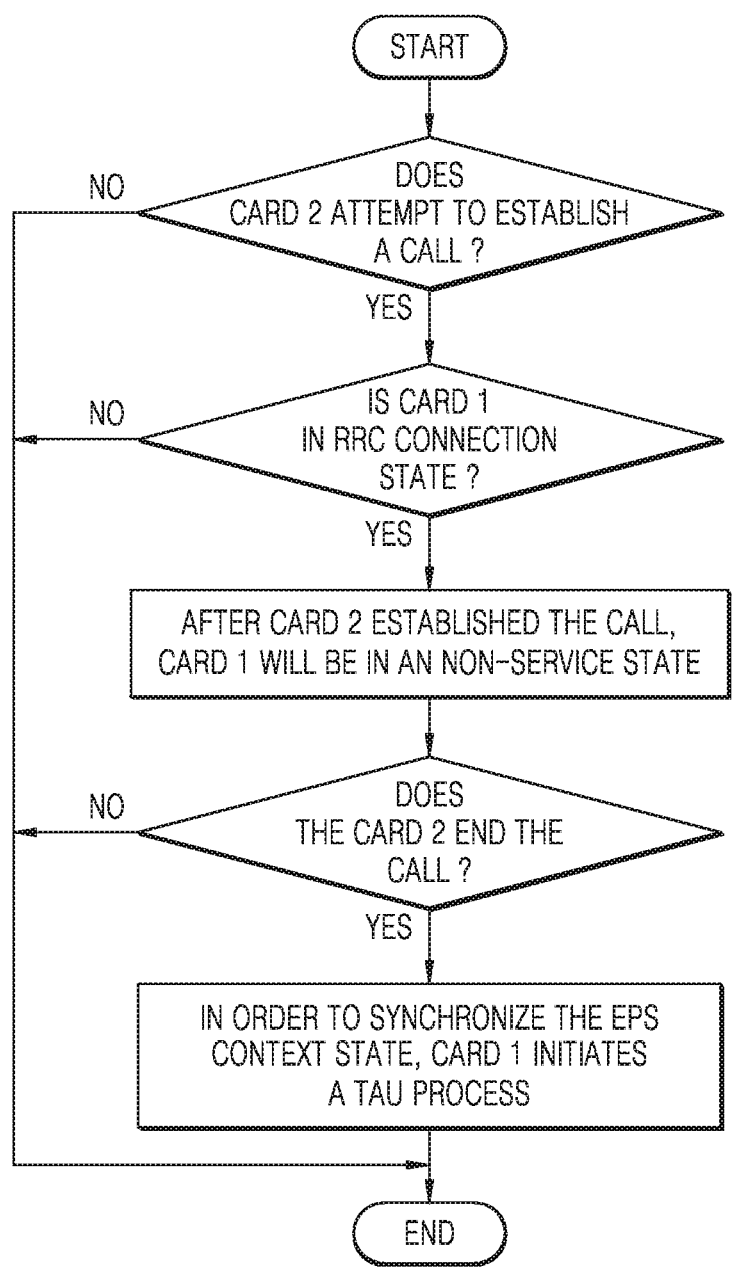
FIG. 9 is a schematic diagram illustrating application scenario 4 according to an embodiment of the disclosure.

FIG. 9 is a schematic diagram illustrating application scenario 4 according to an embodiment of the disclosure.

Referring to FIG. 9, before the card 2 attempts to establish a call, if receiving a call request from the user or receiving a paging message or an invite message transmitted by the network side, it indicates that the card 2 may attempt to establish a call. At this time, the terminal may first detect whether the card 1 is in the RRC connection state, and if the card 1 is in the RRC connection state, the card 1 will be in the non-service state after the card 2 ends the call, therefore, the terminal will immediately initiate one TAU process for the card 1 after the card 2 ends the call, wherein the TAU process is mainly used to synchronize the EPS context states between the terminal side and the network side. The terminal may transmit a TAU request message to the network side, wherein the TAU request message carries information, such as a local location area (or tracking area) identifier, a network-assigned terminal temporary identifier, a local EPS context state and the like. After receiving the TAU request message, the network side may check a local EPS context state, and if the local EPS context state does not match the EPS context state reported by the card 1, then the corresponding EPS context state may be set to 0 in the TAU accept message returned to the card 1, that is, indicating the EPS context state of the IMS PDN is the deactivation state. After the card 1 receiving the TAU accept message indicating that the EPS context state of the IMS PDN of the network side is the deactivation state, the card 1 will immediately initiate the IMS PDN activation process and the IMS registration process. Then, after the card 2 ends the call, the card 1 may normally establish a VoLTE call.

It may be understood that the application scenario 1 may be applied to the terminal of dual-card, dual-standby, single-active and single-VoLTE in combination with the application scenario 3 or the application scenario 4. The application scenario 2 may also be applied to the terminal of dual-card, dual-standby, single-active and dual-VoLTE in combination with the application scenario 3 or the application scenario 4.

In addition, for a terminal of dual-card, dual-standby and single-active, whether it is a terminal without VoLTE, or with single VoLTE or dual-VoLTE, despite the application scenario of a call service performed by the card 1 or the card 2, an appropriate modification of the application scenario 1 or the application scenario 2 may be applied, which should also belong to the spirit or scope of the application.

In addition, for a terminal of dual-card, dual-standby and single-active, whether it is a terminal of single VoLTE or dual-VoLTE, on the condition of the application scenario that for the VoLTE card, the other card is performing a call service, an appropriate modification of the application scenario 3 or the application scenario 4 may be applied, which should also belong to the spirit or scope of the disclosure.

Figure 10:
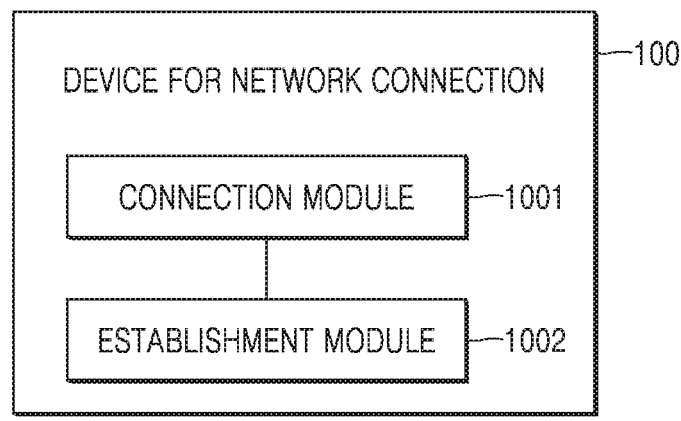
FIG. 10 is a schematic structural diagram illustrating a device for network connection according to an embodiment of the disclosure.

The embodiment of the disclosure also provides a device for network connection, and as shown in FIG. 10.

FIG. 10 is a schematic structural diagram illustrating a device for network connection according to an embodiment of the disclosure.

Referring to FIG. 10, the device for network connection 100 may include connection module 1001 and establishment module 1002, wherein, the connection module 1001 may be configured to connect to a detected available Wi-Fi network for a target identity module; and; the establishment module 1002 may be configured to establish an IMS network connection for the target identity module based on the connected Wi-Fi network.

According to an embodiment of the disclosure, the device for network connection 100 may further include: a first detection module, wherein, the first detection module may be configured to detect the available Wi-Fi network for the target identity module when the target identity module is unable to access the mobile network.

According to an embodiment of the disclosure, the first detection module may be specifically configured to detect the available Wi-Fi network when the target identity module has no available mobile network, or when another identity module performs call services.

According to an embodiment of the disclosure, the connection module 1001 may be specifically configured to connect to the Wi-Fi network based on the detected Wi-Fi hotspot of the other identity module for the target identity module.

According to an embodiment of the disclosure, the first detection module may be specifically configured to enable the Wi-Fi hotspot of the other identity module; and detect a Wi-Fi hotspot of the other identity module for the target identity module.

According to an embodiment of the disclosure, the first detection module may be specifically configured to scan the available Wi-Fi network for the target identity module, and enable the Wi-Fi hotspot of the other identity module when no Wi-Fi network is available.

According to an embodiment of the disclosure, the device for network connection 100 may further include: a second detection module and a network interaction module, wherein, the second detection module may be configured to detect, before the other identity module establishes a call, whether the target identity module is in an RRC connection state; the network interaction module may be configured to migrate the RRC state of the target identity module in the RRC connection state to the idle state, or synchronize with the network side for the EPS context state of the target identity module in the RRC connection state.

According to an embodiment of the disclosure, the network interaction module may be specifically configured to migrate the RRC state of the target identity module in the RRC connection state to the idle state before the other identity module establishes a call.

According to an embodiment of the disclosure, the network interaction module may be specifically configured to synchronize with the network side for the EPS context state of the target identity module in the RRC connection state after the other identity module ends the call.

According to an embodiment of the disclosure, the network interaction module may be specifically configured to initiate a TAU process for the target identity module in the RRC connection state, such that the network side releases the RRC connection of the target identity module in the RRC connection state.

According to an embodiment of the disclosure, the network interaction module may be specifically configured to initiate a TAU process for the target identity module in an RRC connection state, and establish the IMS network connection for the target identity module in the RRC connection state when the TAU accept message fed back by the network side indicates that the EPS context state is the deactivation state.

The device for network connection provided by the embodiment of the disclosure, in the case of the other identity module performing the call service, uses the VoWi-Fi service for the target identity module to ensure the communication service of the target identity module; and for the case of the target identity module supporting VoLTE service, before the other identity module establishing a call, if detecting that the target identity module is in the RRC connection state, the RRC state of the target identity module in the RRC connection state may be migrated to the idle state, or synchronizing with the network side for the EPS context state of the target identity module in the RRC connection state, such the target identity module is capable of establishing a VoLTE call without delay after the other identity module ends the call, thereby significantly improving the user experience.

Those skilled in the art may clearly understand that the implementation principle and the technical effects of the device for network connection provided by the embodiments of the disclosure are the same as the foregoing method embodiments, and for convenient and concise description, the unmentioned parts in the device embodiments may be referred to the corresponding content in the foregoing method embodiments, and details will not be described herein again.

The embodiment of the disclosure further provides a device for network connection.

Figure 11:
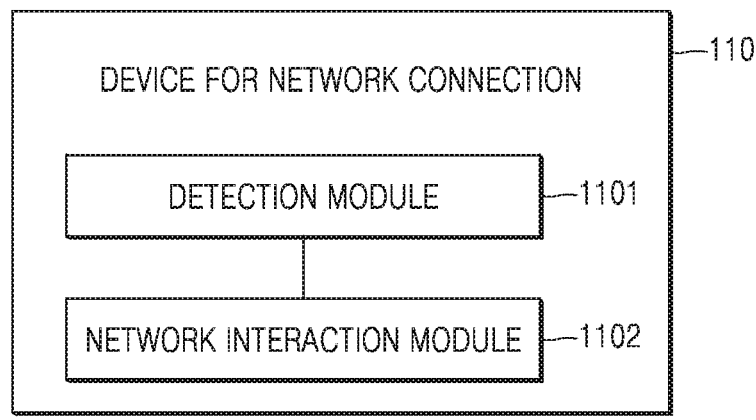
FIG. 11 is a schematic structural diagram illustrating another device for network connection according to an embodiment of the disclosure.

FIG. 11 is a schematic structural diagram illustrating another device for network connection according to an embodiment of the disclosure.

Referring to FIG. 11, the device for network connection 110 may include: a detection module 1101 and a network interaction module 1102, wherein, the detection module 1101 may be configured to detect, before any one of the identity modules establishes a call, whether the other identity module is in an RRC connection state; the network interaction module 1102 may be configured to migrate the RRC state of the identity module in the RRC connection state to the idle state, or synchronize with the network side for the EPS context state of the identity module in the RRC connection state.

According to an embodiment of the disclosure, the network interaction module 1102 may be specifically configured to migrate an RRC state of an identity module in the RRC connection state to the idle state before any one of the identity modules establishes a call.

According to an embodiment of the disclosure, the network interaction module 1102 may be specifically configured to synchronize with the network side for the EPS context state of the identity module in the RRC connection state after any one of the identity modules ends the call.

According to an embodiment of the disclosure, the network interaction module 1102 may be specifically configured to initiate a TAU process for the identity module in the RRC connection state, such that the network side releases the RRC connection of the identity module in the RRC connection state.

According to an embodiment of the disclosure, the network interaction module 1102 may be specifically configured to initiate a TAU process for the identity module in the RRC connection state, and establish the IMS network connection for the identity module in the RRC connection state when the TAU accept message fed back by the network side indicates that the EPS context state is the deactivation state.

The device for network connection provided by the embodiment of the disclosure, before any one of the identity modules establishing a call, may detect whether the other target identity module is in the RRC connection state; migrate the RRC state of the target identity module in the RRC connection state to the idle state, or synchronize with the network side for the EPS context state of the identity module in the RRC connection state, such the target identity module is capable of establishing a VoLTE call without delay after the any of identity modules ends the call, thereby significantly improving the user experience.

These skilled in the art may clearly understand that the implementation principle and the technical effects of the device for network connection provided by the embodiments of the disclosure are the same as the foregoing method embodiments, and for convenient and concise description, the unmentioned parts in the device embodiments may be referred to the corresponding content in the foregoing method embodiments, and details will not be described herein again.

The embodiment of the disclosure further provides an electronic apparatus, including: a processor and a memory, wherein the memory stores at least one instruction, at least one program, a code set, or a set of instructions, and the at least one instruction, at least one program, a code set, or a set of instructions is loaded and executed by the processor to implement the corresponding content in the foregoing method embodiments.

According to an embodiment of the disclosure, the electronic apparatus may also include a transceiver. The processor may be connected to the transceiver, for example via a bus. It should be noted that, in the actual application, the number of transceivers is not limited to one, and the structure of the electronic apparatus does not constitute a limitation on the embodiment of the application.

Wherein, the processor may be a CPU, a general-purpose processor, a DSP, an ASIC, an FPGA or another programmable logic device, a transistor logic device, a hardware component, or any combination thereof. It is possible to implement or execute the various illustrative logical blocks, modules and circuits described in combination with the disclosure. The processor may also be a combination for implementing computing functions, for example one or more microprocessor combinations, a combination of a DSP and a microprocessor, and the like.

The bus may include a path for transferring information between the components described above. The bus may be a peripheral component interconnect (PCI) bus or an extended industrial standard architecture (EISA) bus, etc. The bus may include an address bus, a data bus, a control bus, and the like. The memory may be a read-only memory (ROM) or another type of static storage device that may store static information and instructions, a random-access memory (RAM) or another type of dynamic storage devices that may store information and instructions; and may also be an EEPROM, a compact disc-ROM (CD-ROM), or other compact disc storage, an optical disk (including a compact disc, a laser disc, an optical disc, a digital versatile disc, and a Blu-ray disc, or the like) storage, and magnetic disk storage medium or other magnetic storage devices, or any other medium that may be used to carry or store desired program code that has an instruction or digital structure form and that may be accessed by a computer, which, however, is not limited herein.

The electronic apparatus provided by the embodiment of the disclosure uses the VoWi-Fi service for the target identity module to ensure the communication service of the target identity module when the other identity module is in the state of performing a call service.

Figure 12:
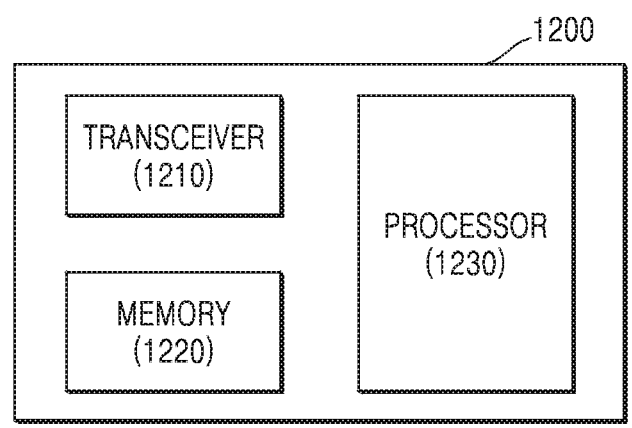
FIG. 12 is a block diagram of a terminal according to an embodiment of the disclosure.

FIG. 12 is a block diagram of a terminal according to an embodiment of the disclosure.

Referring to FIG. 12, a terminal 1200 may include a transceiver 1210, a memory 1220, and a processor 1230. The transceiver 1210, the memory 1220, and the processor 1230 of the terminal 1200 may operate according to the communication method of the terminal 1200 described above. However, components of the terminal 1200 are not limited thereto. For example, the terminal 1200 may include more or less components than those shown in FIG. 12. In addition, the transceiver 1210, the memory 1220, and the processor 1230 may be embodied in the form of a single chip.

The transceiver 1210 may transmit and receive a signal to and from a base station. Here, the signal may include control information and data. In this regard, the transceiver 1210 may include a radio frequency (RF) transmitter up-converting and amplifying a frequency of a transmitted signal and an RF receiver performing low-noise amplification on a received signal and down-converting a frequency. However, such components of the transceiver 1210 are only examples, and are not limited to the RF transmitter and the RF receiver.

In addition, the transceiver 1210 may receive a signal via a wireless channel and output the signal to the processor 1230, and transmit a signal output from the processor 1230 via the wireless channel.

The memory 1220 may store a program and data required for an operation of the terminal. In addition, the memory 1220 may store control information or data included in a signal obtained by the terminal. The memory 1220 may include a storage medium, such as a ROM, a RAM, a hard disk, a CD-ROM, or a digital versatile disc (DVD), or a combination thereof. In addition, the memory 1220 may include a plurality of memories. According to an embodiment of the disclosure, the memory 1220 may store a program for supporting beam-based cooperative communication.

The processor 1230 may control a series of processes such that the terminal 1200 operates according to the embodiment of the disclosure. For example, the processor 1230 may control to connect to a detected wireless fidelity (Wi-Fi) network for a target identity module of the terminal, and establish an IP multimedia subsystem (IMS) network connection for the target identity module of the terminal 1200 based on the connected Wi-Fi network. Here, in relation to operations of the processor 1230, only some of the operations of the embodiments of the disclosure have been described, but the processor 1230 may control all processes such that the terminal 1200 may operate according to all or some of the embodiments of the disclosure.

According to an embodiment of the disclosure, for a dual SIM single VoLTE terminal, if the SIM2 (working on 3G or 2G mode) is in a voce call, the SIM1 (working on VoLTE mode) may try to connect available Wi-Fi networks and try to register the IMS service via Wi-Fi (VoWi-Fi). Therefore, the SIM1 may initiate or receive a voice call, video call or SMS even if the SIM2 is in a voice call or video call.

According to an embodiment of the disclosure, for a dual SIM VoLTE terminal, if SIM1 (or SIM2) is in a voice/video call, the SIM2 (or SIM1) will try to connect available Wi-Fi networks and try to register the IMS service via Wi-Fi (VoWi-Fi). Therefore, the SIM2 (or SIM1) may initiate or receive a voice call, video call or SMS even if the SIM1 (or SIM2) is in a voice call or video call.

According to an embodiment of the disclosure, if there is no any available external Wi-Fi network to use for solution 1 or solution 2 above. The data SIM (e.g., SIM1) can share a data service as a Wi-Fi Hotspot. The other SIM (i.e. SIM2) may connect this Wi-Fi hotspot and try to register the IMS service via Wi-Fi (VoWi-Fi).

According to an embodiment of the disclosure, a method for operating a terminal includes connecting to a detected Wi-Fi network for a target identity module of the terminal; and establishing an IP multimedia subsystem (IMS) network connection for the target identity module of the terminal based on the connected Wi-Fi network.

According to an embodiment of the disclosure, the method includes: detect the Wi-Fi network for the target identity module of the terminal based on the target identity module of the terminal being unable to access a mobile network.

According to an embodiment of the disclosure, the detecting of the Wi-Fi network for the target identity module of the terminal includes: detecting the Wi-Fi network for the target identity module of the terminal, based on at least one of the target identity module of the terminal including no available mobile network, or another module performing a call service.

According to an embodiment of the disclosure, the connecting to the detected Wi-Fi network includes: connecting to the Wi-Fi network for the target identity module of the terminal based on a Wi-Fi hotspot of the other identity module.

According to an embodiment of the disclosure, the method includes: detecting whether the target identity module of the terminal is in an RRC connection state before the other identity module establishes a call; and changing RRC state of the target identity module of the terminal from the RRC connection state to an idle state, or synchronizing with a network side for an EPS context state of the target identity module of the terminal in the RRC connection state.

According to an embodiment of the disclosure, the changing of the RRC state of the target identity module of the terminal includes: changing the RRC state of the target identity module of the terminal from the RRC connection state to the idle state before the other identity module establishes a call, and the synchronizing with the network side for the EPS context state of the target identity module of the terminal includes: synchronizing with the network side for the EPS context state of the target identity module of the terminal in the RRC connection state, after the other identity module ends the call.

According to an embodiment of the disclosure, the changing of the RRC state of the target identity module of the terminal includes: initiating a TAU process for the target identity module in the RRC connection state, such that the network side releases the RRC connection of the target identity module of the terminal in the RRC connection state.

According to an embodiment of the disclosure, the method includes: detecting whether an identity module of the terminal is in a radio resource control (RRC) connection state, before any one of identity modules establishes a call; and changing RRC state of the identity module of the terminal from the RRC connection state to an idle state, or synchronizing with a network side for an evolved packet system (EPS) context state of the identity module of the terminal in the RRC connection state.

According to an embodiment of the disclosure, the changing of the RRC state of the identity module of the terminal includes: changing the RRC state of the identity module of the terminal from the RRC connection state to the idle state before the any one of identity modules establishes a call, and wherein the synchronizing with the network side for the EPS context state of the identity module of the terminal in the RRC connection state, includes: synchronizing with the network side for the EPS context state of the identity module of the terminal in the RRC connection state after the any one of the identity modules ends the call.

According to an embodiment of the disclosure, the changing of the RRC state of the identity module of the terminal includes: initiating a TAU process for the identity module of the terminal in the RRC connection state, such that a network side releases the RRC connection of the identity module of the terminal in the RRC connection state.

According to an embodiment of the disclosure, a terminal includes: a transceiver; a memory; and at least one processor configured to: connect to a detected Wi-Fi network for a target identity module of the terminal, and establish an IMS network connection for the target identity module of the terminal based on the connected Wi-Fi network.

According to an embodiment of the disclosure, the at least one processor is further configured to detect the Wi-Fi network for the target identity module of the terminal based on the target identity module of the terminal being unable to access a mobile network.

According to an embodiment of the disclosure, the at least one processor is further configured to detect the Wi-Fi network for the target identity module of the terminal, based on at least one of the target identity module of the terminal including no available mobile network, or another module performs performing a call service.

According to an embodiment of the disclosure, the at least one processor is further configured to connect to the Wi-Fi network for the target identity module of the terminal based on a Wi-Fi hotspot of the other identity module.

According to an embodiment of the disclosure, the at least one processor is further configured to: detect whether the target identity module of the terminal is in an RRC connection state before the other identity module establishes a call, and change RRC state of the target identity module of the terminal from the RRC connection state to an idle state, or synchronizing with a network side for an EPS context state of the target identity module of the terminal in the RRC connection state.

According to an embodiment of the disclosure, wherein the at least one processor is further configured to: change the RRC state of the target identity module of the terminal from the RRC connection state to the idle state before the other identity module establishes a call, and synchronize with the network side for the EPS context state of the target identity module of the terminal in the RRC connection state, after the other identity module ends the call.

According to an embodiment of the disclosure, the at least one processor is further configured to initiate a TAU process for the target identity module in the RRC connection state, such that the network side releases the RRC connection of the target identity module of the terminal in the RRC connection state.

According to an embodiment of the disclosure, the at least one processor is further configured to: detect whether an identity module of the terminal is in a radio resource control (RRC) connection state, before any one of identity modules establishes a call, and change RRC state of the identity module of the terminal from the RRC connection state to an idle state, or synchronize with a network side for an evolved packet system (EPS) context state of the identity module of the terminal in the RRC connection state.

According to an embodiment of the disclosure, the at least one processor is further configured to: change the RRC state of the identity module of the terminal from the RRC connection state to the idle state before the any one of identity modules establishes a call, and synchronize with the network side for the EPS context state of the identity module of the terminal in the RRC connection state after the any one of the identity modules ends the call.

According to an embodiment of the disclosure, the at least one processor is further configured to initiate a TAU process for the identity module of the terminal in the RRC connection state, such that a network side releases the RRC connection of the identity module of the terminal in the RRC connection state.

The embodiment of the disclosure further provides a computer readable storage medium, the computer readable storage medium is used for storing computer instructions, that when executed on a computer, enables the computer to execute the corresponding content in the foregoing method embodiments.

The embodiments of the disclosure provide an apparatus and method for network connection in a mobile communication system.

Methods according to embodiments of the disclosure described in claims or specification of the disclosure may be implemented as hardware, software, or a combination of hardware and software.

When implemented as software, a computer-readable storage medium or computer program product storing at least one program (software module) may be provided. The at least one program stored in the computer-readable storage medium or computer program product is configured to be executable by one or more processors in an electronic device. The one or more processors include instructions causing the electronic device to execute the methods according to embodiments of the disclosure described in the claims or the specification of the disclosure.

The at least one program (the software module, the software) may be stored in a non-volatile memory including a random-access memory (RAM) and a flash memory, a read-only memory (ROM), an electrically erasable programmable read-only memory (EEPROM), a magnetic disc storage device, a CD-ROM, DVDs, other optical storage devices, a magnetic cassette, or the like, or a memory configured with any or all combinations thereof. In addition, each of the configured memories may be provided in a multiple number.

The at least one program may be stored in an attachable storage device that can be accessed via a communication network including the Internet, an Intranet, a local area network (LAN), a wide LAN (WLAN), or a storage area network (SAN), or a combination thereof. The storage device may access, via an external port, an apparatus for performing embodiments of the disclosure. In addition, a separate storage device on a communication network may access the apparatus for performing embodiments of the disclosure.

It should be understood that although the operations in the flowcharts of drawings are presented successively according to the arrows, these operations will not be successively performed necessarily in the order indicated by the arrows. Unless expressly stated by the disclosure, these operations will not be limited to a strict order, but may be performed in any order. Furthermore, at least a part of the operations in the flowcharts of drawings may include multiple sub-operations or multiple stages. These sub-operations or stages will not necessarily be performed at the same time, but may be performed in different time. These sub-operations or stages will not necessarily be performed successively, but may be performed alternatively with other operations or at least a part of the sub-operations or stages of other operations.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method for operating a terminal, the method comprising:
   identifying whether a wireless fidelity (Wi-Fi) network for a second identity module in the terminal is detected in a case that a call service is established by a first identity module in the terminal and the second identity module in the terminal is unable to access a mobile network;
   in a case that the Wi-Fi network for the second identity module is detected,
      connecting to the detected Wi-Fi network for the second identity module; and
      establishing an internet protocol (IP) multimedia subsystem (IMS) network connection for the second identity module based on the connected Wi-Fi network while the established call service by the first identity module continues; and
   in a case that the Wi-Fi network for the second identity module is not detected,
      detecting a Wi-Fi hotspot of the first identity module;
      connecting to the Wi-Fi network for the second identity module based on the detected Wi-Fi hotspot; and
      establishing the IP IMS network connection for the second identity module based on the connected Wi-Fi network,
   wherein the first identity module shares a data service with the second identity module while the established call service by the first identity module continues.

2. The method of claim 1, further comprising:
   detecting whether the second identity module in the terminal is in a radio resource control (RRC) connection state before the first identity module establishes a call; and
   changing an RRC state of the second identity module in the terminal from the RRC connection state to an idle state, or synchronizing with a network side for an evolved packet system (EPS) context state of the second identity module in the terminal in the RRC connection state.

3. The method of claim 2,
   wherein the changing of the RRC state of the second identity module of in the terminal comprises:
      changing the RRC state of the second identity module in the terminal from the RRC connection state to the idle state before the first identity module establishes a call, and
   wherein the synchronizing with the network side for the EPS context state of the second identity module in the terminal comprises:
      synchronizing with the network side for the EPS context state of the second identity module in the terminal in the RRC connection state, after the first identity module ends the call.

4. The method of claim 3,
   wherein the changing of the RRC state of the second identity module of in the terminal comprises initiating a tracking area update (TAU) process for the second identity module in the RRC connection state, and
   wherein the network side releases an RRC connection of the second identity module in the terminal in the RRC connection state.

5. The method of claim 1, further comprising:
   detecting whether an identity module in the terminal is in a radio resource control (RRC) connection state, before any one of identity modules establishes a call; and
   changing an RRC state of the identity module in the terminal from the RRC connection state to an idle state, or synchronizing with a network side for an evolved packet system (EPS) context state of the identity module in the terminal in the RRC connection state.

6. The method of claim 5,
   wherein the changing of the RRC state of the identity module in the terminal comprises:
      changing the RRC state of the identity module in the terminal from the RRC connection state to the idle state before the any one of identity modules establishes a call, and
   wherein the synchronizing with the network side for the EPS context state of the identity module in the terminal in the RRC connection state, comprises:
      synchronizing with the network side for the EPS context state of the identity module in the terminal in the RRC connection state after the any one of the identity modules ends the call.

7. The method of claim 6,
   wherein the changing of the RRC state of the identity module in the terminal comprises initiating a tracking area update (TAU) process for the identity module in the terminal in the RRC connection state, and
   wherein a network side releases an RRC connection of the identity module in the terminal in the RRC connection state.

8. A terminal comprising:
   a transceiver;
   a memory; and
   at least one processor configured to:
      identify whether a wireless fidelity (Wi-Fi) network for a second identity module in the terminal is detected in a case that a call service is established by a first identity module in the terminal and the second identity module in the terminal is unable to access a mobile network,
      in a case that the Wi-Fi network for the second identity module is detected,
         connect to the detected Wi-Fi network for the second identity module, and
         establish an internet protocol (IP) multimedia subsystem (IMS) network connection for the second identity module based on the connected Wi-Fi network while the established call service by the first identity module continues, and
      in a case that the Wi-Fi network for the second identity module is not detected,
         detect a Wi-Fi hotspot of the first identity module,
         connect to the Wi-Fi network for the second identity module based on the detected Wi-Fi hotspot, and
         establish the IP IMS network connection for the second identity module based on the connected Wi-Fi network, wherein the first identity module shares a data service with the second identity module while the established call service by the first identity module continues.

9. The terminal of claim 8, wherein the at least one processor is further configured to:
   detect whether the second identity module in the terminal is in a radio resource control (RRC) connection state before the first identity module establishes a call, and
   change an RRC state of the second identity module in the terminal from the RRC connection state to an idle state, or synchronizing with a network side for an evolved packet system (EPS) context state of the second identity module in the terminal in the RRC connection state.

10. The terminal of claim 9, wherein the at least one processor is further configured to:
    change the RRC state of the second identity module in the terminal from the RRC connection state to the idle state before the first identity module establishes a call, and
    synchronize with the network side for the EPS context state of the second identity module in the terminal in the RRC connection state, after the first identity module ends the call.

11. The terminal of claim 10,
    wherein the at least one processor is further configured to initiate a tracking area update (TAU) process for the second identity module in the RRC connection state, and
    wherein the network side releases an RRC connection of the second identity module in the terminal in the RRC connection state.

12. The terminal of claim 8, wherein the at least one processor is further configured to:
    detect whether an identity module in the terminal is in a radio resource control (RRC) connection state, before any one of identity modules establishes a call, and
    change an RRC state of the identity module in the terminal from the RRC connection state to an idle state, or synchronize with a network side for an evolved packet system (EPS) context state of the identity module in the terminal in the RRC connection state.

13. The terminal of claim 12, wherein the at least one processor is further configured to:
    change the RRC state of the identity module in the terminal from the RRC connection state to the idle state before the any one of identity modules establishes a call, and
    synchronize with the network side for the EPS context state of the identity module in the terminal in the RRC connection state after the any one of the identity modules ends the call.

14. The terminal of claim 13,
    wherein the at least one processor is further configured to initiate a tracking area update (TAU) process for the identity module in the terminal in the RRC connection state, and
    wherein a network side releases an RRC connection of the identity module in the terminal in the RRC connection state.

* * * * *